United States Patent [19]

Masumoto

[11] Patent Number: 4,634,236
[45] Date of Patent: Jan. 6, 1987

[54] COMPACT ZOOM LENS SYSTEM OF A RELATIVELY HIGH ZOOM RATIO CAPABLE OF PROVIDING A WIDE FIELD ANGLE

[75] Inventor: Hisayuki Masumoto, Sakai, Japan

[73] Assignee: Minolta Camera Kabushiki Kaisha, Osaka, Japan

[21] Appl. No.: 270,150

[22] Filed: Jun. 2, 1981

[30] Foreign Application Priority Data

Jun. 12, 1980 [JP] Japan .................. 55-79932
Jul. 28, 1980 [JP] Japan .................. 55-104186

[51] Int. Cl.$^4$ .................. G02B 15/163; G02B 15/22; G03B 17/14
[52] U.S. Cl. .................. 350/427; 350/423; 350/428; 350/450; 354/286
[58] Field of Search .......... 350/423, 427, 428, 449, 350/450; 354/286

[56] References Cited

U.S. PATENT DOCUMENTS

| | | | |
|---|---|---|---|
| 3,481,666 | 12/1969 | Higuchi | 350/184 |
| 3,549,242 | 12/1970 | Higuchi et al. | 350/184 |
| 3,884,555 | 5/1975 | Suwa et al. | 350/428 X |
| 3,912,376 | 10/1975 | Ogura et al. | 350/428 |
| 3,975,089 | 8/1976 | Betensky | 350/427 |
| 4,198,126 | 4/1980 | Abe et al. | 350/427 |
| 4,240,700 | 12/1980 | Ogawa et al. | 350/184 |

FOREIGN PATENT DOCUMENTS 55-62419  1/1980  Japan .

OTHER PUBLICATIONS

Betensky et al; "Continuous Close Focusing Telephoto Zoom Lenses;" SPIE; vol. 237; 1980 Intl. Lens Design Conference; pp. 488–496.
Tokina 35–105 mm Lens: (a) Advertisement, Modern Photography, April 1980, (b) Pamphlet for the PMA Show, 1980, (c) Article at pp. 82–84 of Camera Review, Sep. 1980.
All of the Canon, Nov. 1976.

Primary Examiner—John K. Corbin
Assistant Examiner—Scott J. Sugarman
Attorney, Agent, or Firm—Price, Gess & Ubell

[57] ABSTRACT

A compact zoom lens system capable of providing a high zoom ratio ranging to a wide field angle is provided. The zoom lens system utilizes four separate lens groups or units with the first lens group or unit being of a positive refractive power and the fourth lens group or unit being capable of axial movement for focusing. The zooming mode of operation is capable of being provided by the first three lens groups or units, while the fourth lens group or unit can be separated and, in fact, integrally mounted for a focusing movement in the camera body. Thus, interchangeable lens system without independent focusing can be positioned on the camera body.

41 Claims, 178 Drawing Figures

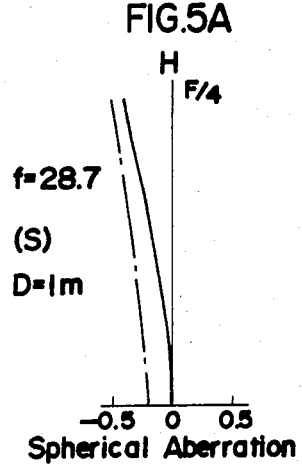
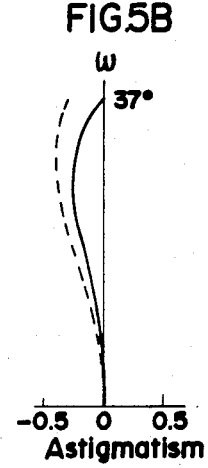
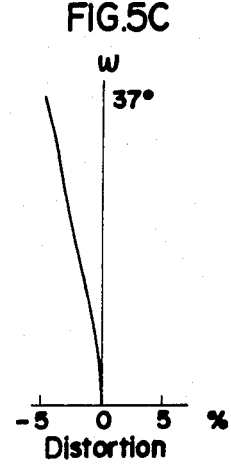
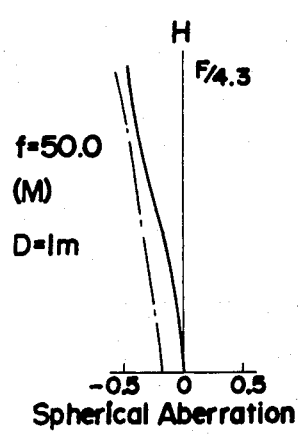
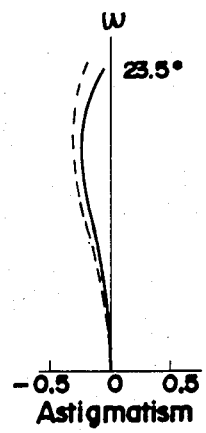
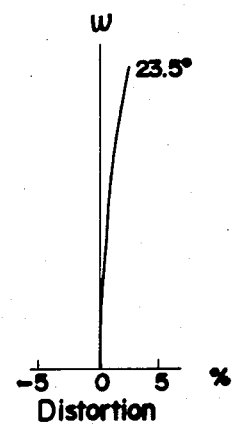
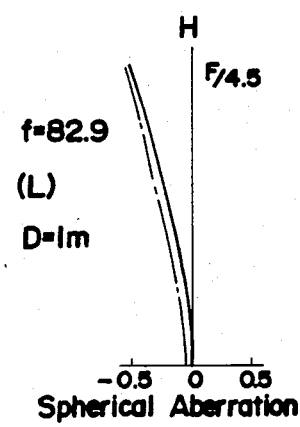
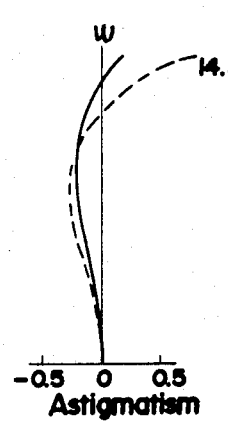
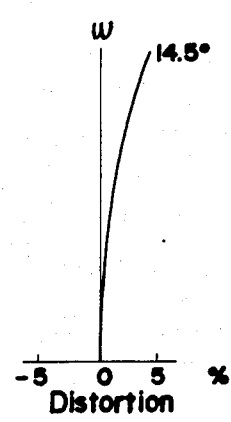

(S)

(L)

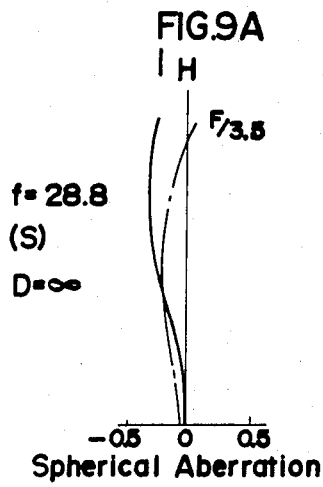
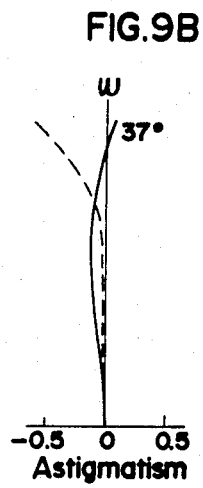
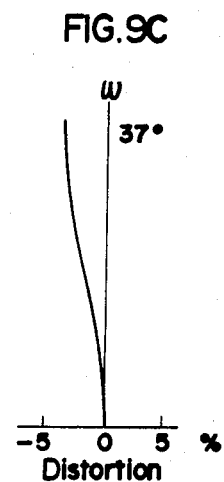
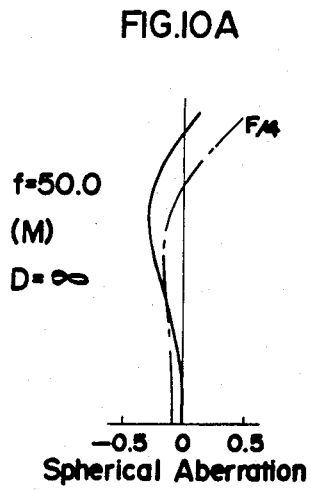
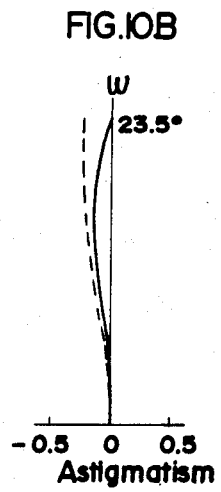
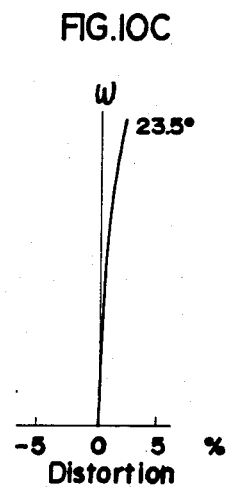
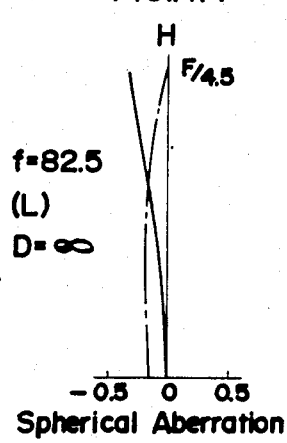
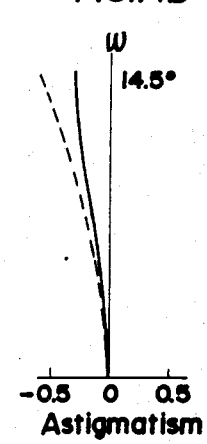
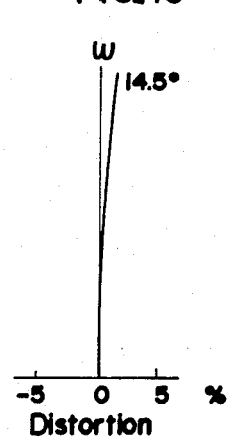

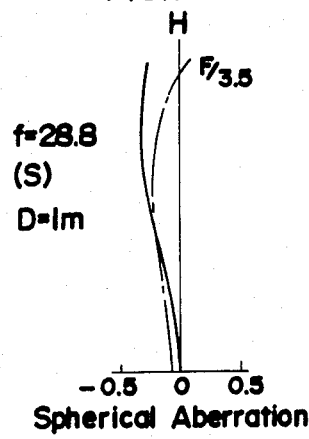
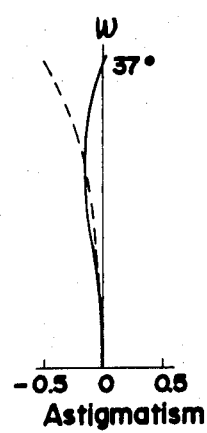
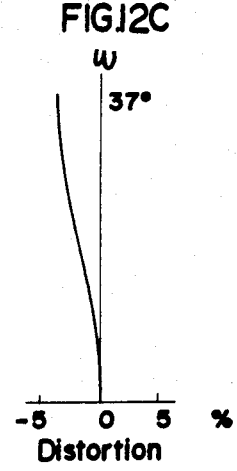
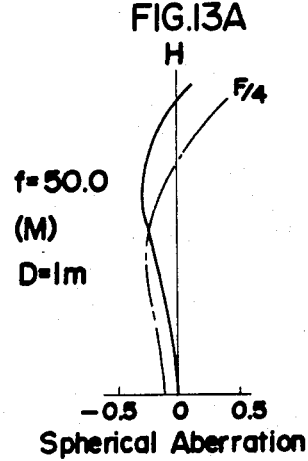
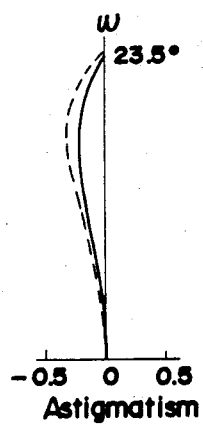
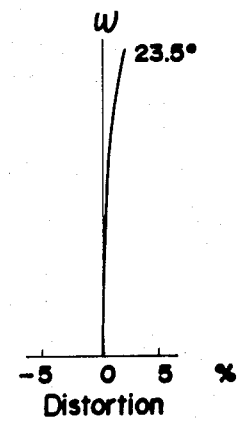
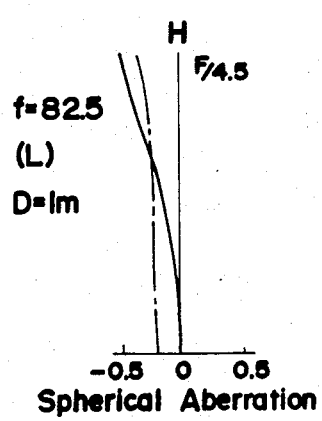
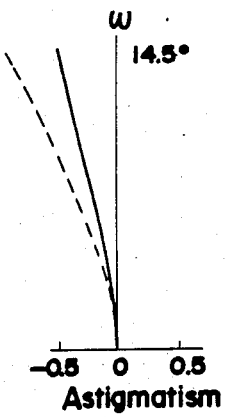
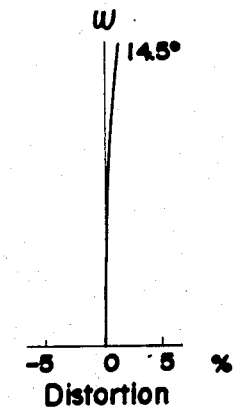

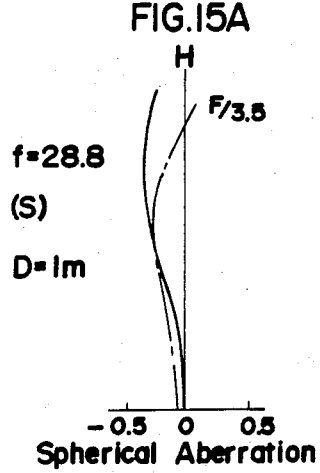
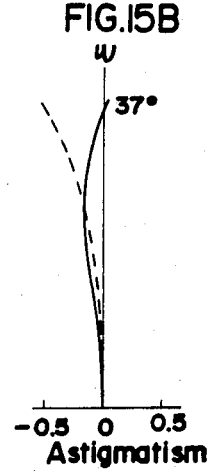
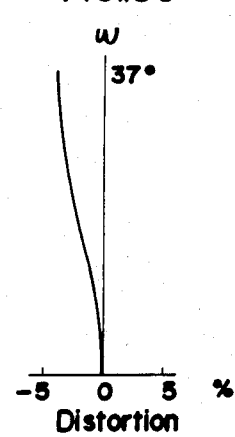
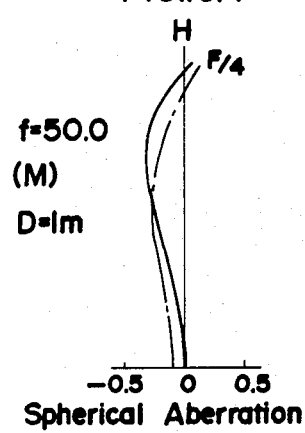
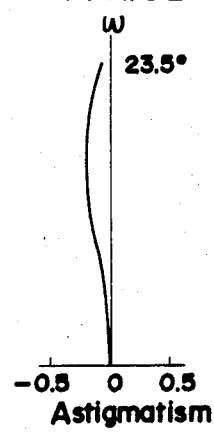
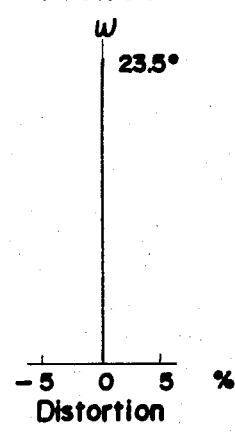
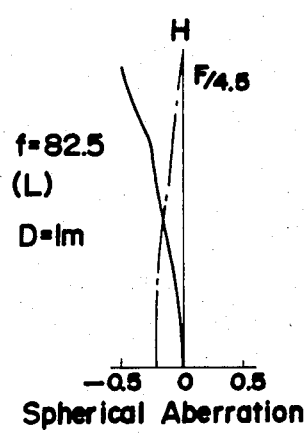
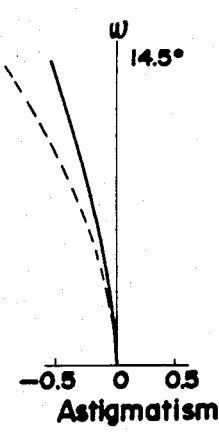
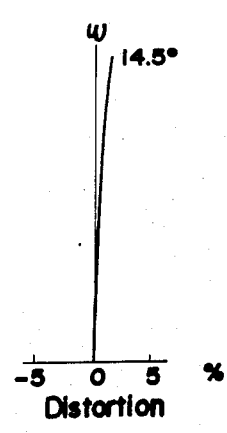

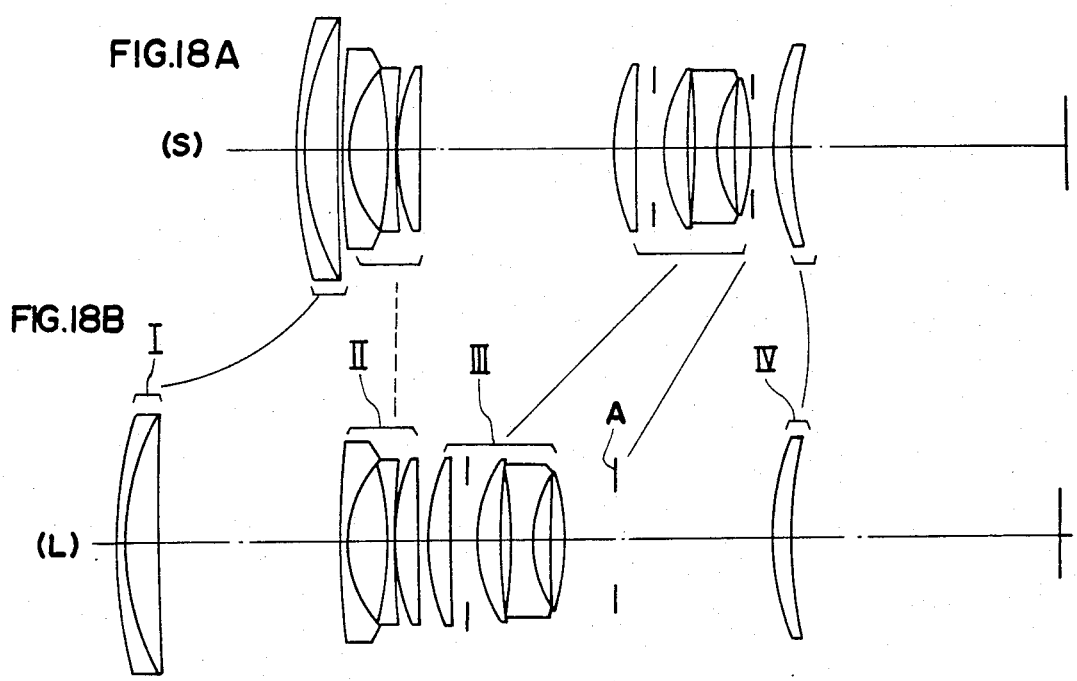

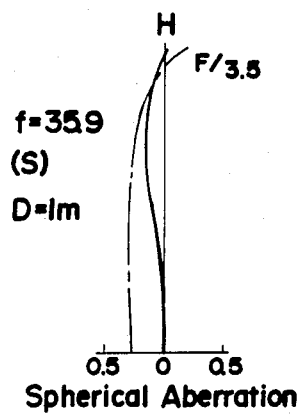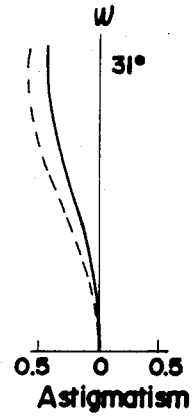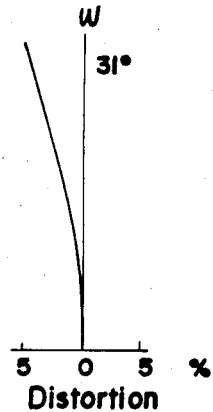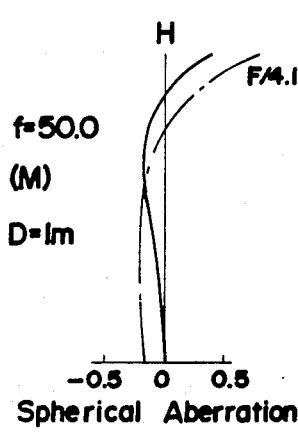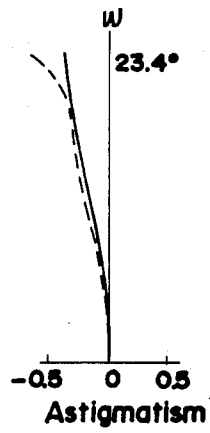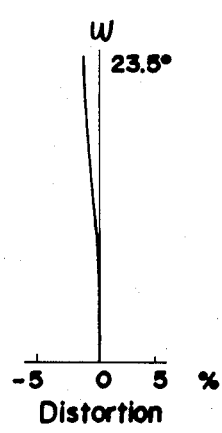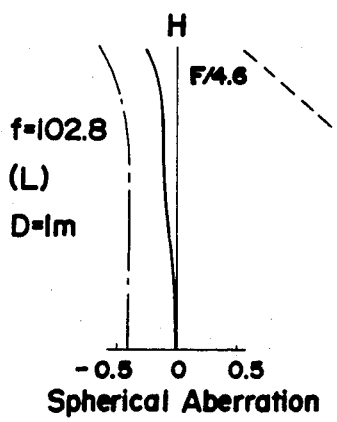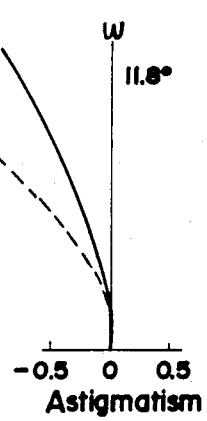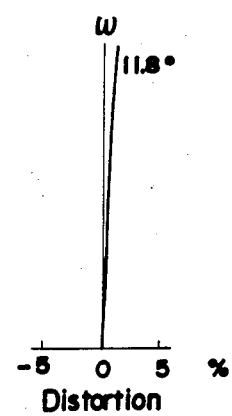

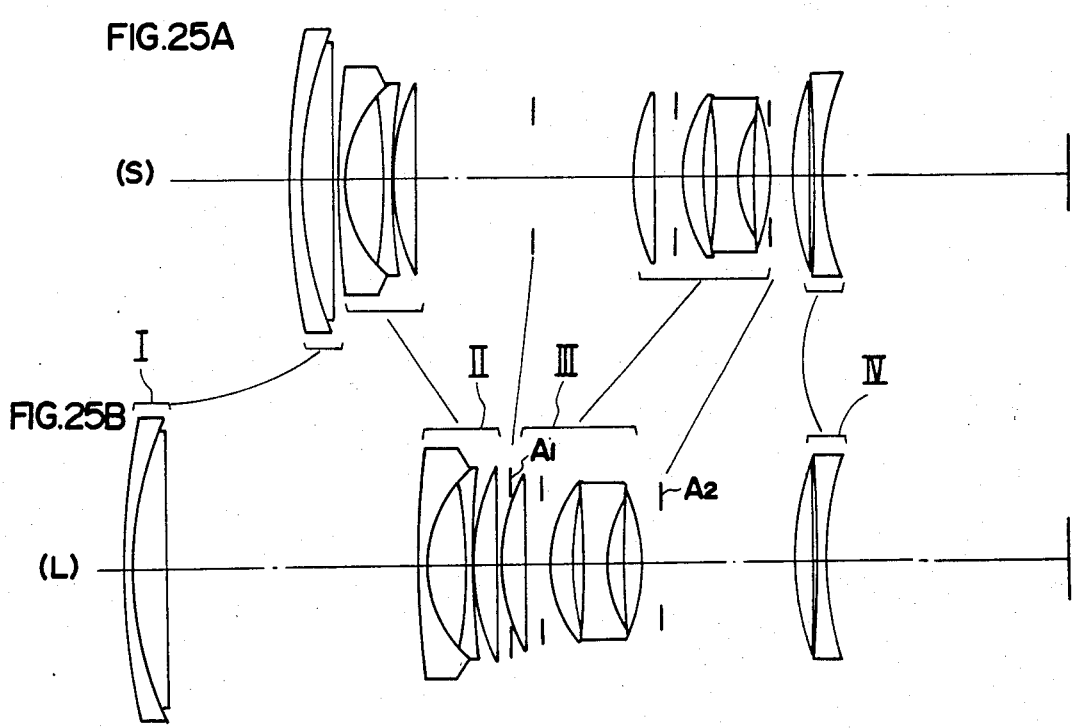

f=35.9
(S)
D=1m
Spherical Aberration

Astigmatism

Distortion f=50.0
(M)
D=1m
Spherical Aberration

Astigmatism

Distortion f=102.8
(L)
D=1m
Spherical Aberration

Astigmatism

Distortion

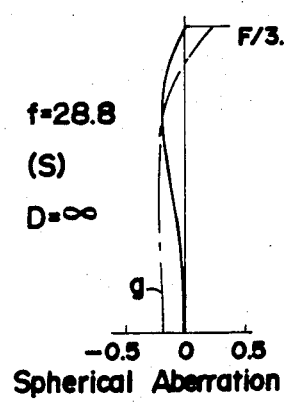
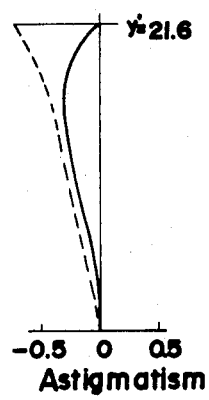
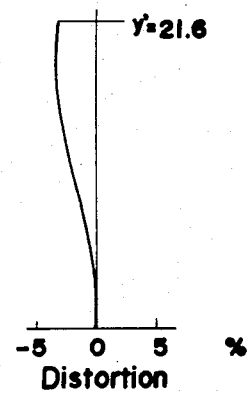
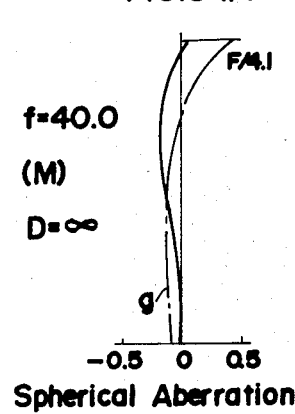
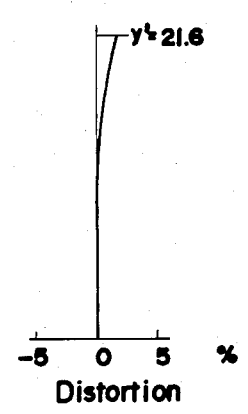
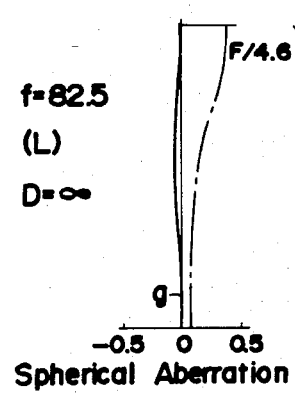
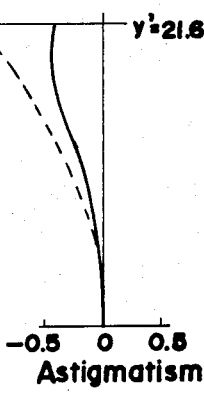
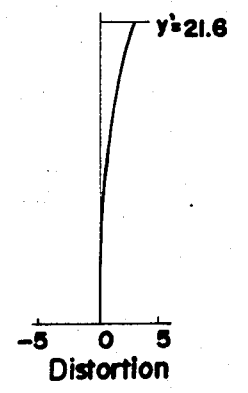

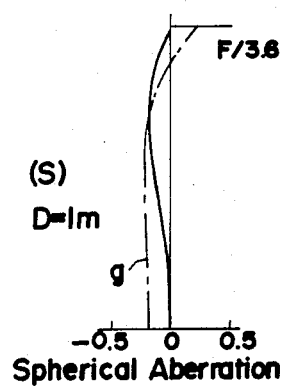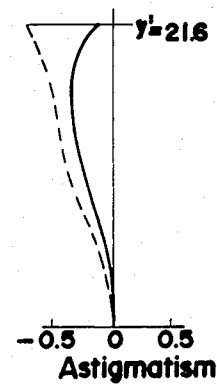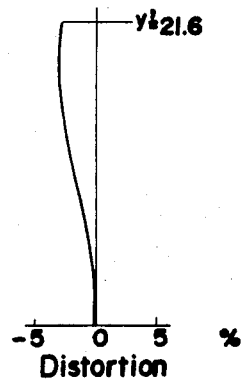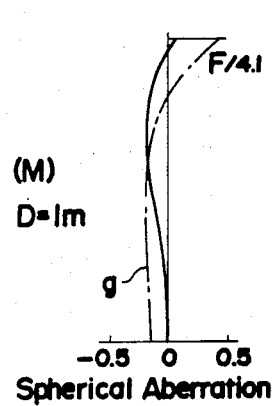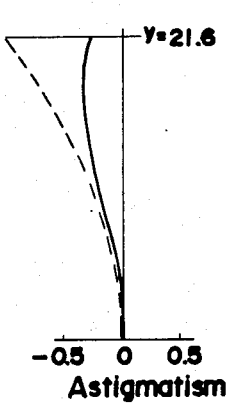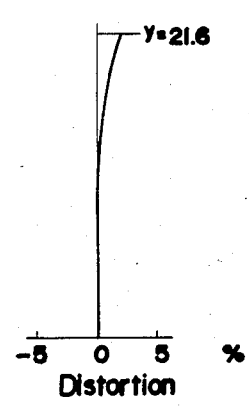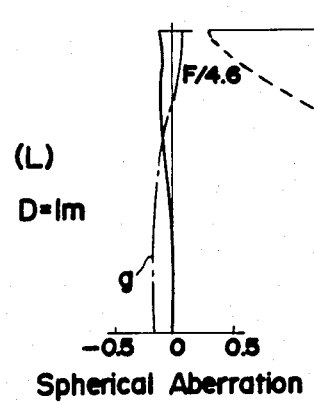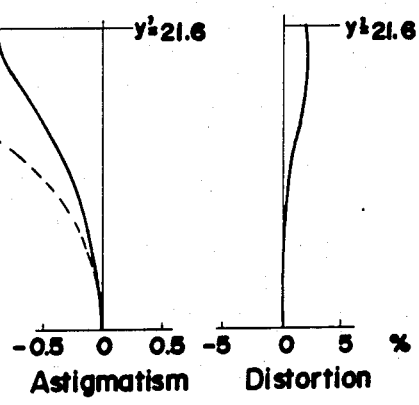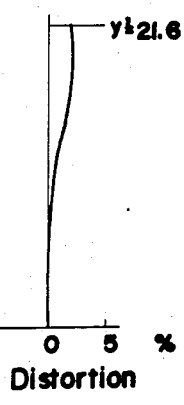

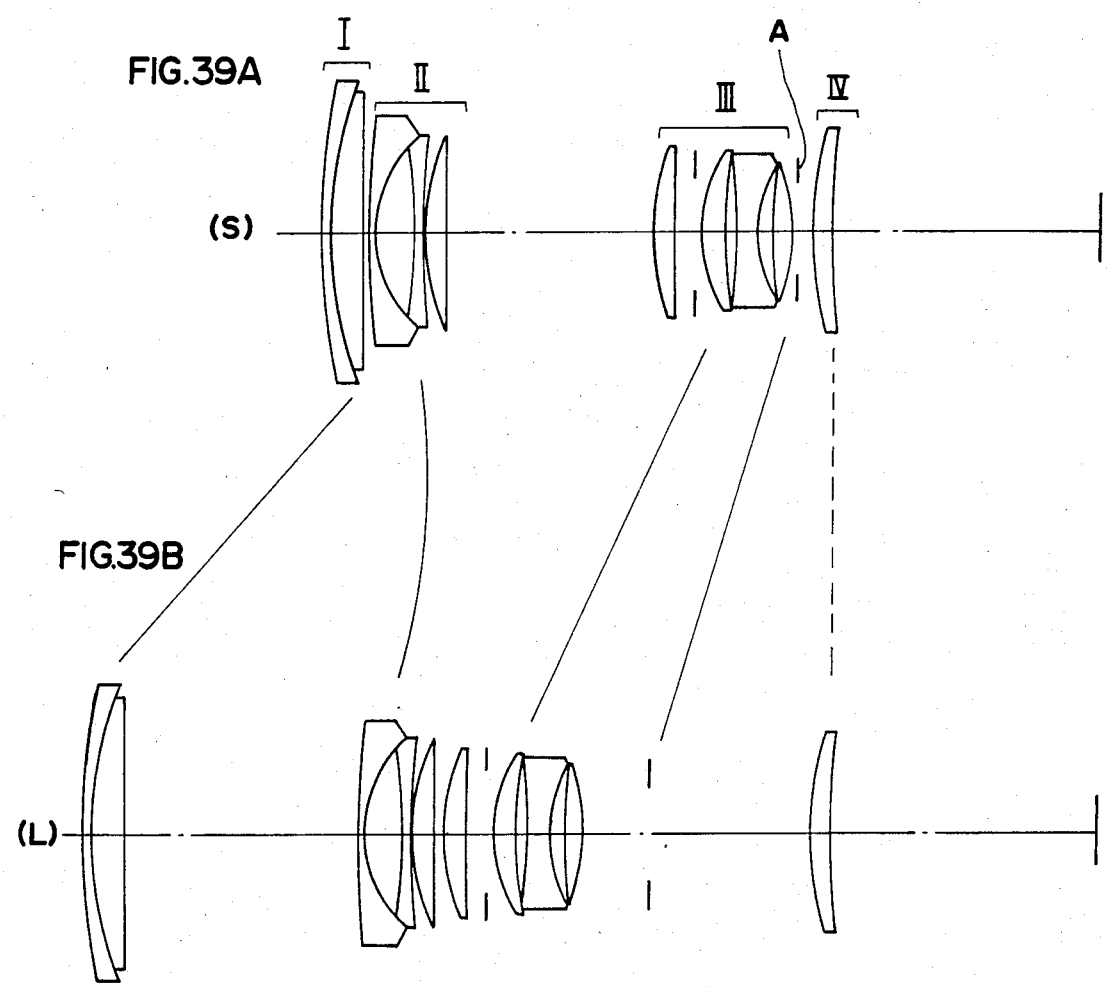

f=35.880
(S)
D=∞
Spherical Aberration

Astigmatism

Distortion f=49.833
(M)
D=∞
Spherical Aberration

Astigmatism

Distortion f=102.781
(L)
D=∞
Spherical Aberration

Astigmatism

Distortion

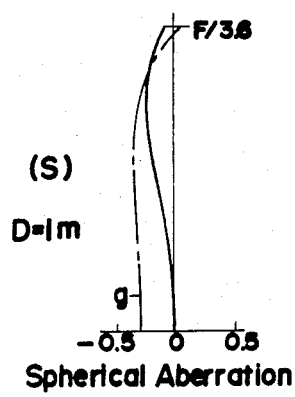
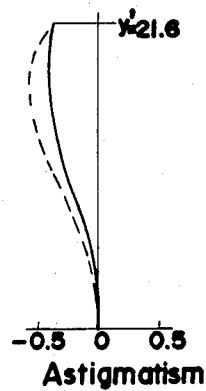
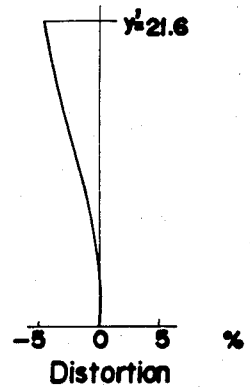
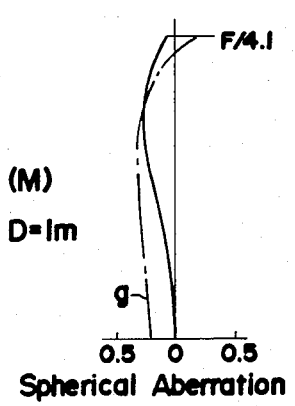
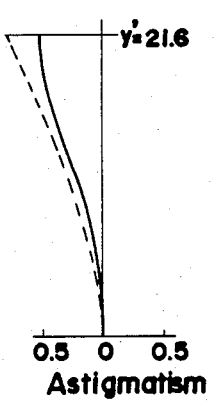
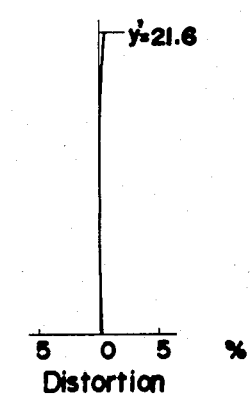
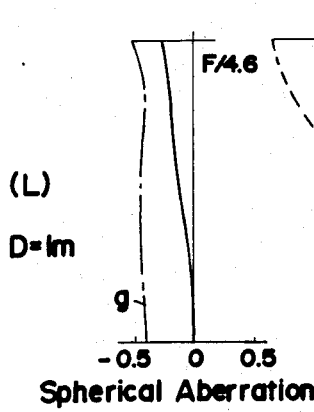
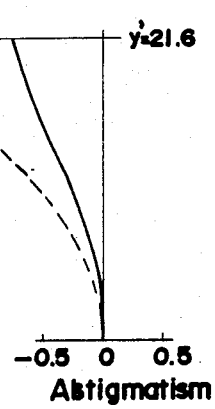
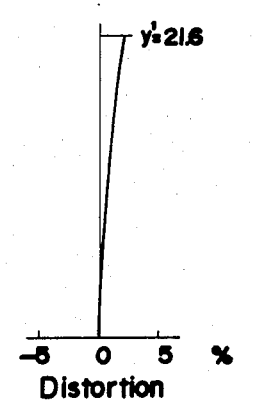

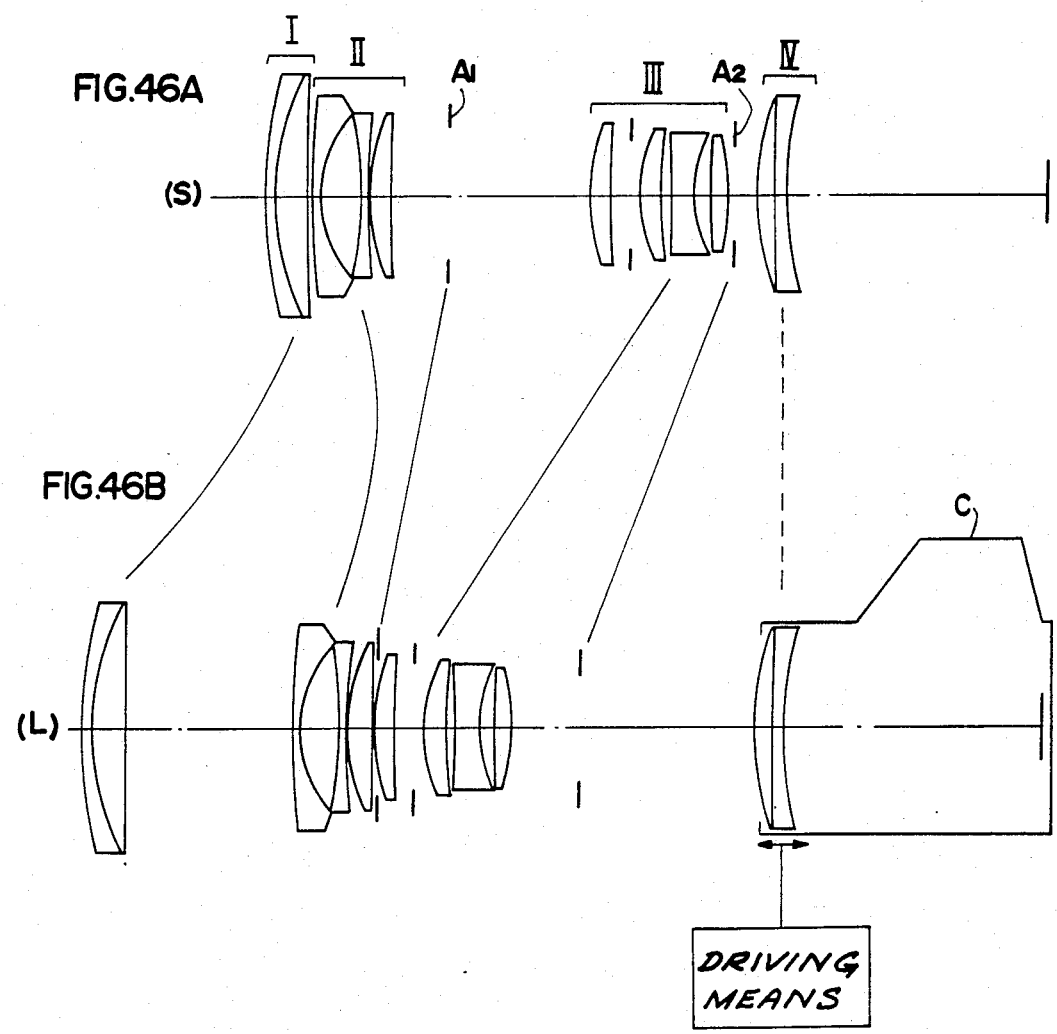

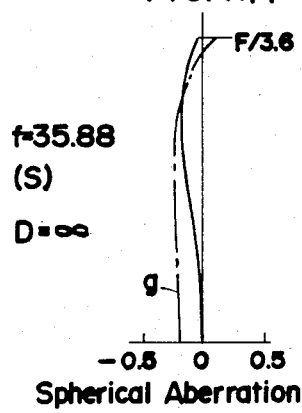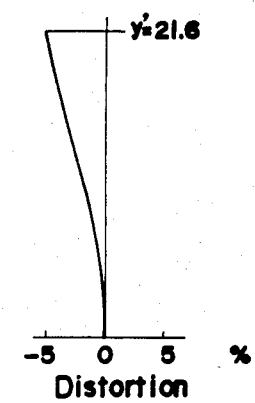
FIG.47A  FIG.47B  FIG.47C
f=35.88 (S) D=∞
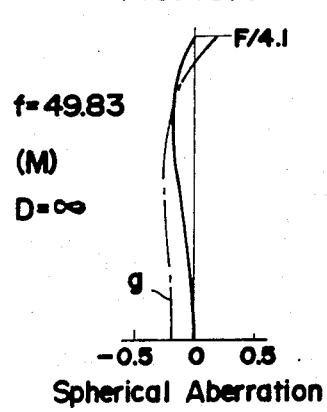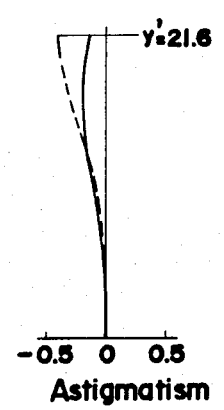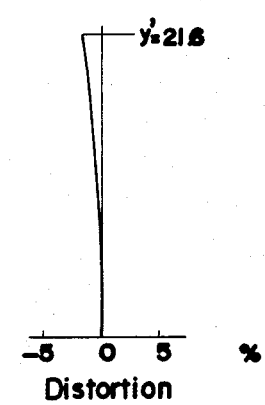
FIG.48A  FIG.48B  FIG.48C
f=49.83 (M) D=∞
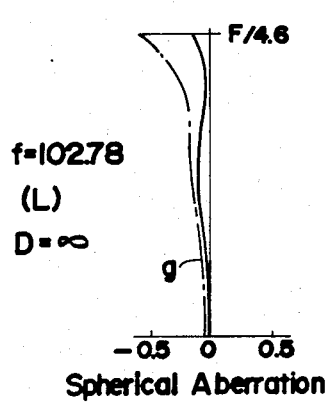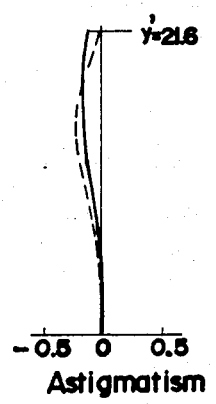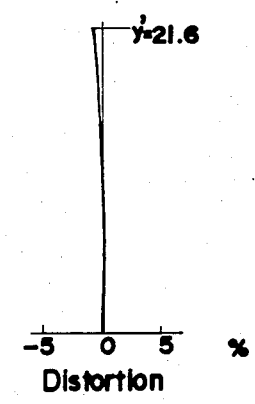
FIG.49A  FIG.49B  FIG.49C
f=102.78 (L) D=∞

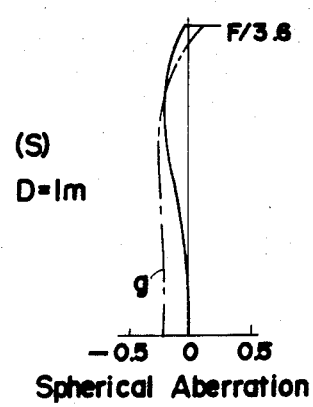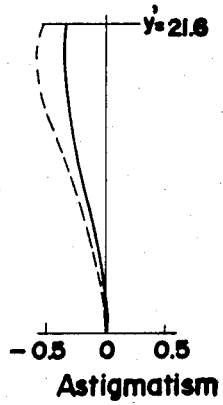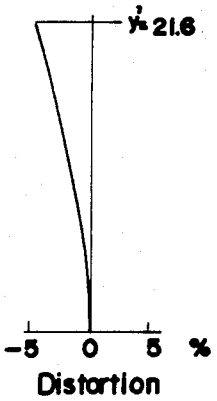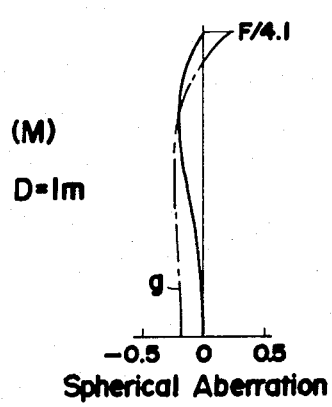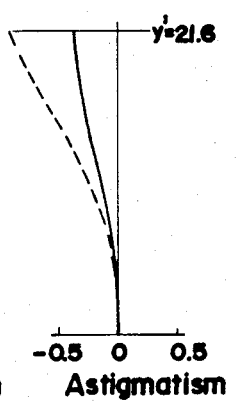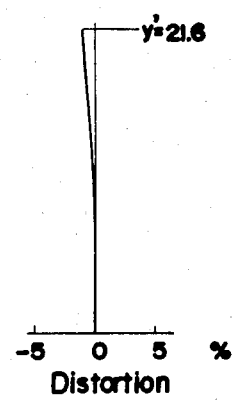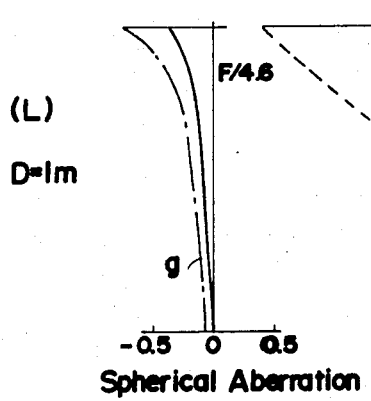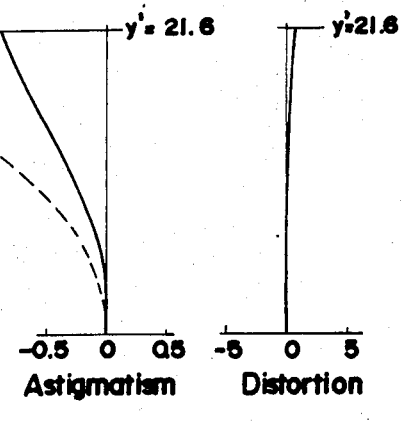

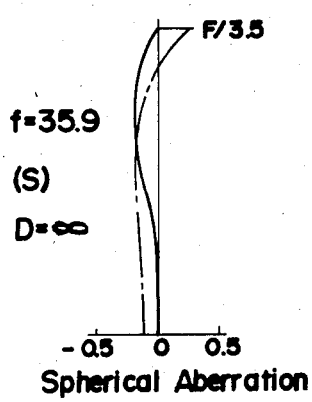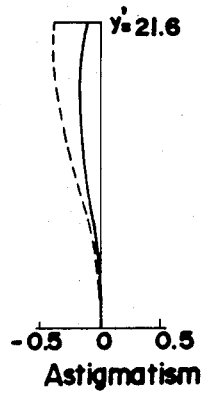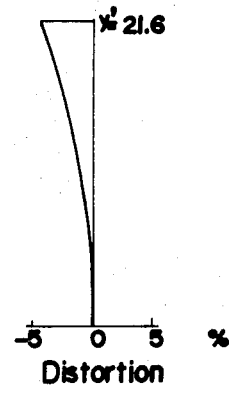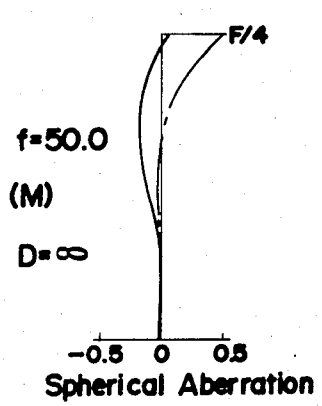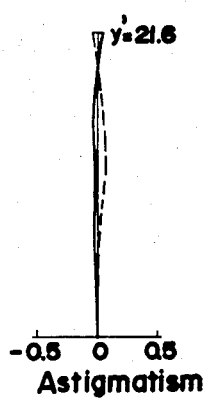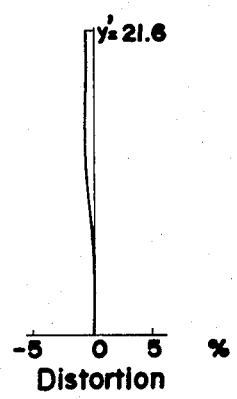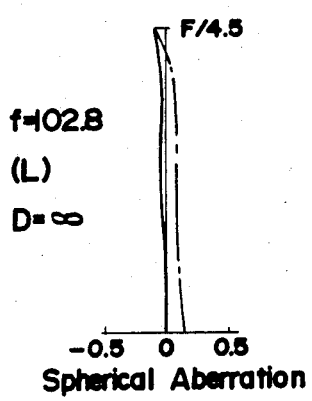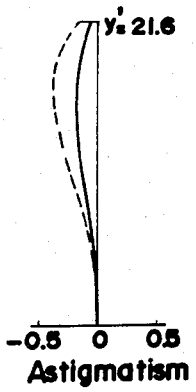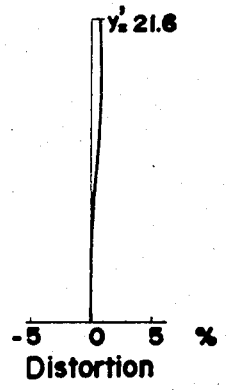

F/3.5
(S)
D=1m
−0.5 0 0.5
Spherical Aberration y'=21.6
−0.5 0 0.5
Astigmatism y'=21.6
−5 0 5 %
Distortion F/4
(M)
D=1m
−0.5 0 0.5
Spherical Aberration y'=21.6
−0.5 0 0.5
Astigmatism y'=21.6
−5 0 5 %
Distortion F/4.5
(L)
D=1m
−0.5 0 0.5
Spherical Aberration y'=21.6
−0.5 0 0.5
Astigmatism y'=21.6
−5 0 5 %
Distortion

COMPACT ZOOM LENS SYSTEM OF A RELATIVELY HIGH ZOOM RATIO CAPABLE OF PROVIDING A WIDE FIELD ANGLE

BACKGROUND OF THE INVENTION

1. Field of the Invention

The present invention relates to a zoom lens system having relatively high zoom ratios of about 3 ranging to a wide field angle. More specifically, the present invention is capable of providing a zooming range of 28 to 85 mm, 35 to 85 mm, 35 to 105 mm, and 45 to 135 mm lens systems that are suitable for 35 mm single lens reflex cameras, while sufficiently balancing the aberrations that occur over the entire range of zooming.

2. Description of the Prior Art

It is generally known in the prior art that a zoom lens system is not readily adaptable to a relatively high zoom ratio ranging to a wide angle, particularly when it is also desired to be a relatively lightweight compact lens system. It is also known that focusing in the zoom lens system is conventionally achieved by means of axial movement of the front lens group. This design choice is exercised in zoom lens systems because the degree of movement required of the focusing lens group to focus an identical object distance does not change with change in focal length. If, however, the refractive power of the front lens group is positive, then the diameter of the front lens group has to be increased to provide a desired wide field angle when it is moved towards the object side for focusing. The choice of a positive refractive power for the front lens group generally increases the total length of the lens system. If the lens designer selects a negative refractive power for the front lens group, then other problems are also created since it is difficult to increase the zoom ratio because of the necessary aberration correction, the lens system will not be as tolerant to manufacturing error, and the resulting lens system will generally be bulky.

Examples of patented prior art literature can be found in U.S. Pat. No. 3,481,666, U.S. Pat. No. 3,549,242, and U.S. Pat. No. 4,240,700. Additional prior art can be found in the Japanese Patent Application Laid Open No. 55-62419 of May 10, 1980, which claims respective priority dates from the U.S. patent application Ser. No. 941,430 (Sept. 11, 1978) now abandoned, and U.S. patent application Ser. No. 70,749 (Sept. 5, 1979) now U.S. Pat. No. 4,299,454. Finally, published advertisements and articles on the TOKINA 35-105 mm F/3.5-4.3 lens can be found in "Modern Photography", April 1980, and at pages 82-84 of the "Camera Review" of September 1980.

The prior art is still seeking to provide a relatively compact and economical zoom lens system having a relatively wide range of zooming into the wide angle range with adequate optical correction.

SUMMARY OF THE INVENTION

An object of the present invention is to provide a zoom lens system with a relatively high zoom ratio ranging to a wide field angle while maintaining a compact size.

Another object of the present invention is to provide a zoom lens system with aberrations well corrected across the entire zoom range.

Still another object of the present invention is to provide a zoom lens system with an increased tolerance to any manufacturing error.

A further object of the present invention is to provide a zoom lens system with an improved focusing system.

Still another further object of the present invention is to provide a zoom lens system that is particularly suitable for mounting on an automatic focused control camera.

The present invention provides a zoom lens system having a first positive lens group or unit, a second negative lens group or unit, a third positive lens group or unit, and a fourth lens group or unit of relatively simple construction. The total refractive power of the first and second lens groups or units is negative.

The air spaces between the first and second lens groups or units, second and third lens groups or units, and third and fourth lens groups or units are variable during the zooming mode of operation. The fourth lens group or unit as a whole, or at least a portion thereof, is movable along the optical axis, while the other lens groups or units and elements are held stationary during a focusing mode of operation.

The zoom lens system of the present invention can further fulfill the following conditions to provide a compact, aberration corrected zoom lens system:

$$0.4 \frac{1}{f_L} < \frac{1}{f_I} < \frac{1}{f_L} \tag{1}$$

$$2.5 \frac{1}{f_I} < \frac{1}{|f_{II}|} < 5.0 \frac{1}{f_I} \tag{2}$$

$$-0.5 \frac{1}{f_L} < \frac{1}{f_{IV}} < \frac{1}{f_L} \tag{3}$$

$$0.25 f_L < |f_{II}| < 0.6 f_L \tag{4}$$

$$0.3 f_L < f_{III} < 0.7 f_L \tag{5}$$

wherein: $f_I$, $f_{II}$, $f_{III}$, and $f_{IV}$ represent focal lengths of the first to fourth lens groups or units, respectively, and $f_L$ represents the longest focal length of the whole lens system.

In addition, if the refractive power of the focusing lens group or unit is positive, then the lens system according to the present invention fulfills the following condition:

$$0.05 f_S < D_S < 0.5 f_S \tag{6}$$

wherein: $f_S$ represents the shortest focal length of the whole lens system, and $D_S$ represents the air space between the third and fourth lens groups or units for the shortest focal length.

For simplifying the lens movement, the second lens group or unit can be left stationary during zooming according to the present invention as disclosed in the embodiments of FIGS. 18 and 53. In this case, the lens system further fulfills the following condition:

$$-f_{I,II} < f_{I,II,III} \tag{7}$$

wherein: $f_{I,II}$ represents the total focal length of the first and second lens groups or units; and $f_{I,II,III}$ represents the total focal length of the first to third lens groups or units.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIGS. 5A to 5C represent aberration curves of the first embodiment for the shortest focal length in close focusing;

FIGS. 6A to 6C represent the aberration curves of the first embodiment for the medium focal length in close focusing;

FIGS. 7A to 7C represent the aberration curves of the first embodiment for the longest focal length in close focusing;

FIGS. 9A to 9C represent aberration curves of the second embodiment for the shortest focal length;

FIGS. 10A to 10C represent aberration curves of the second embodiment for a medium focal length;

FIGS. 11A and 11B represent aberration curves of the second embodiment for the longest focal length;

FIGS. 12A to 12C represent the aberration curves of the second embodiment for the shortest focal length in close focusing;

FIGS. 13A and 13B represent the aberration curves of the second embodiment for the medium focal length in close focusing;

FIGS. 14A to 14C represent the aberration curves of the second embodiment for the longest focal length in close focusing;

FIGS. 15A to 15C represent the aberratin curves of the second embodiment for the shortest focal length in a different type of close focusing;

FIGS. 16A to 16C represent the aberration curves of the second embodiment for the medium focal length in the different type of close focusing;

FIGS. 17A to 17C represent the aberration curves of the second embodiment for the longest focal length in the different type of close focusing;

FIGS. 18A and 18B represent cross sectional views of the lens system according to a third embodiment of the present invention for the shortest and longest focal lengths, respectively;

FIGS. 22A to 22C represent the aberration curves of the third embodiment for the shortest focal length in close focusing;

FIGS. 23A to 23C represent the aberration curves of the third embodiment for the medium focal length in close focusing;

FIGS. 24A to 24C represent the aberration curves of the third embodiment for the longest focal length in close focusing;

FIGS. 25A and 25B represent cross sectional views of the lens system according to a fourth embodiment of the present invention for the shortest and longest focal lengths, respectively;

FIGS. 30A to 30C represent the aberration curves of the fourth embodiment for the medium focal length in close focusing;

FIGS. 33A to 33C represent the aberration curves of the fifth embodiment for the shortest focal length;

FIGS. 34A to 34C represent the aberration curves of the fifth embodiment for the medium focal length;

FIGS. 35A to 35C represent the aberration curves of the fifth embodiment for the longest focal length;

FIGS. 36A to 36C represent the aberration curves of the fifth embodiment for the shortest focal length in close focusing;

FIGS. 37A to 37C represent the aberration curves of the fifth embodiment for the medium focal length in close focusing;

FIGS. 38A to 38C represent the aberration curves of the fifth embodiment for the longest focal length in close focusing;

FIGS. 39A and 39B represent cross sectional views of the lens system according to a sixth embodiment of the present invention for the shortest and longest focal lengths, respectively;

FIGS. 43A to 43C represent the aberration curves of the sixth embodiment for the shortest focal length in close focusing;

FIGS. 44A to 44C represent the aberration curves of the sixth embodiment for the medium focal length in close focusing;

FIGS. 45A to 45C represent the aberration curves of the sixth embodiment for the longest focal length in close focusing;

FIGS. 46A and 46B represent cross sectional view of the lens system according to a seventh embodiment of the present invention for the shortest and longest focal lengths, respectively;

FIGS. 47A to 47C represent the aberration curves of the seventh embodiment for the shortest focal length;

FIGS. 48A to 48C represent the aberration curves of the seventh embodiment for a medium focal length;

FIGS. 49A to 49C represent the aberration curves of the seventh embodiment for the longest focal length;

FIGS. 50A to 50C represent the aberration curves of the seventh embodiment for the shortest focal length in close focusing;

FIGS. 51A to 51C represent the aberration curves of the seventh embodiment for a medium focal length in close focusing;

FIGS. 52A to 52C represent the aberration curves of the seventh embodiment for the longest focal length in close focusing;

FIGS. 54A to 54C represent the aberration curves of the eighth embodiment for the shortest focal length;

FIGS. 55A to 55C represent the aberration curves of the eighth embodiment for a medium focal length;

FIGS. 56A to 56C represent the aberration curves of the eighth embodiment for the longest focal length;

DETAILED DESCRIPTION OF THE PREFERRED EMBODIMENTS

Figure 1A:
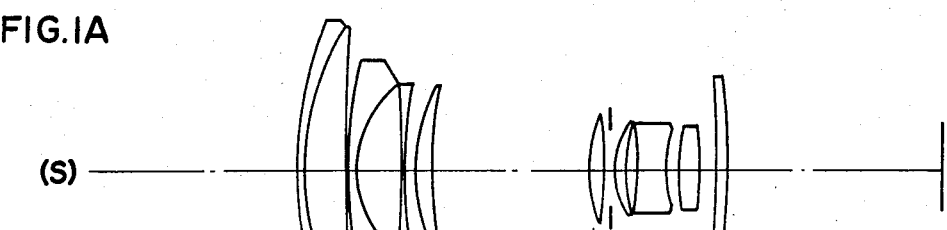
FIG. 1A and 1B represent cross sectional views of the lens system according to a first embodiment of the present invention for the shortest and longest focal lengths, respectively.

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured compact zoom lens system. The derivative of the formulas and the relation of the powers set forth herein can be accomplished with the assistance of a computer. The present invention represents the parameters of a compromise balance of acceptable aberrations which can be relatively easily manufactured to provide a low cost lens system for utilization with a 35 mm SLR camera.

In the drawings, schematic cross sectional views disclose the position of the lens group or unit and lens elements for the respective shortest focal length (S) and longest focal length (L). Due to the number of lens elements involved, it was not deemed appropriate to include individual designation of the radius of curvature and axial distances for each lens element and air space. These values, however, are provided in the accompanying Tables set forth herein, and the schematic cross sectional views of the respective embodiments follow the normal conventions of an object at the left-hand side of the drawing and the image plane at the right-hand side.

As disclosed in FIGS. 1, 8, 18, 25, 32, 39, 46 and 53, the present invention provides a compact zoom lens system of a relatively high zoom ratio, ranging to a wide field angle and comprising from the object to the image side: a first lens group or unit (I) of a positive refractive power; a second lens group or unit (II) of a negative refractive power (the total refractive power of the first and second lens groups or units being negative); a third lens group or unit (III) of a positive refractive power; and a fourth lens group (IV) including at least a focusing lens group or units of a relatively simple and lightweight construction. The air spaces between the first and second lens groups or units, between the second and third lens groups or units and between the third and fourth lens groups or units are changeable during a zooming mode of operation. The focusing lens group or unit is movable for focusing along the optical axis with the remaining lens elements of the lens system, other than the focusing lens group, left stationary.

Further, according to the present invention, the lens system fulfills the following conditions:

$$0.4 \frac{1}{f_L} < \frac{1}{f_I} < \frac{1}{f_L} \tag{1}$$

$$2.5 \frac{1}{f_I} < \frac{1}{|f_{II}|} < 5.0 \frac{1}{f_I} \tag{2}$$

$$-0.5 \frac{1}{f_L} < \frac{1}{f_{IV}} < \frac{1}{f_L} \tag{3}$$

$$0.25 f_L < |f_{II}| < 0.6 f_L \tag{4}$$

$$0.3 f_L < f_{III} < 0.7 f_L \tag{5}$$

wherein: $f_I$, $f_{II}$, $F_{III}$ and $f_{IV}$ represent focal lengths of the first to fourth lens groups or units, respectively; and $f_L$ represents the longest focal length of the whole lens system.

In addition, if the refractive power of the focusing lens group or unit is positive, then the lens system according to the present invention fulfills the following codition:

$$0.5 f_S < D_S < 0.5 f_S \tag{6}$$

wherein: $f_S$ represents the shortest focal length of the whole lens system; and $D_S$ represents the air space between the third and fourth lens groups or units for the shortest focal length.

For simplifying the lens movement, the second lens group or unit can be left stationary during zooming according to the present invention as disclosed in the embodiments of FIGS. 18 and 53. In this case, the lens system further fulfills the following condition:

$$-f_{I,II} < f_{I,II,III} \tag{7}$$

wherein: $f_{I,II}$ represents the total focal length of the first and second lens groups or units; and $f_{I,II,III}$ represents the total focal length of the first to third lens groups or units.

Condition (1) defines the refractive power of the first lens group or unit (I). If the refractive power of the lens system violates the upper limit of condition (1) to thereby resemble a refractive power of a front lens group or unit of a conventional front focusing type zoom lens system, the necessary aberration correction in the zoom range on the shorter focal length side would be difficult and an excessively uneven power distribution in the whole lens system would be caused by maintaining the lens system compact in correlation with the requirement of condition (2) and would further result in an unsatisfactory lens speed. On the other hand, if the lower limit of condition (1) is violated to fail in obtaining a necessary unevenness in power distribution, only a lens system with an undesirably great total length would be obtainable and flare due to spherical aberration would be generated in relation with the restriction of the upper limit of condition (2).

Condition (2) defines the refractive power of the second lens group (II) relative to that of the first lens group or unit (I). If the upper limit is violated, the flare due to spherical aberration would be generated and would result in an unsatisfactory and impractical lens system. On the contrary, if the lower limit is violated, the total negative refractive power of the first and second lens groups or units would be so insufficient that the air space between the second and third lens groups or units would have to be increased, which results in undesirably large diameters for the lens elements of the first and second lens groups or units.

Condition (3) relates to the refractive power of the fourth lens group or unit (IV), and an excessively short total focal length of the first to third lens groups or units would result if the lower limit is violated, which means that aberrations would be difficult to be sufficiently corrected and would be further aggravated by any movement of the fourth lens group (IV). In contrast thereto, if the upper limit is violated, the total focal length of the first to third lens groups or units would be too great to permit a compact zoom lens system.

Condition (4) substantially has the same meaning as condition (2). However, the focal length of the second lens group or unit (II) is defined in relation with the longest focal length of the whole lens system. The impact of the lower and upper limits of condition (4) substantially correspond to those of the upper and lower limits of condition (2), respectively described above.

Condition (5) relates to the focal length of the third lens group or unit (III). If the lower limit is violated, the variable focal length range would not be extended to the desired longest focal length and aberration correction would become difficult because of the excessively short focal length of the third focal length (III). If the upper limit of condition (5) is violated, the variable focal length range could not be extended to the desired shortest focal length unless the compactness of the lens system is sacrificed.

The lower limit of condition (6) relates to a case in which the refractive power of the lens group or unit movable for focusing is positive, and is to secure a space necessary for the movement of the movable lens group or unit. If this limit is violated, a desirable close focusing would be impossible. On the other hand, the upper limit of condition (6) is for obtaining the necessary back focal distance required of an interchangeable lens for the single lens reflex camera with the desired lens compactness maintained.

Condition (7) is necessitated if a lens design in which the first and third lens groups or units are movable in the same direction for zooming with the second lens group or unit left stationary. If condition (7) is violated, the desired lens design would be practically difficult since the first lens group or unit (I) reciprocates on the optical axis during the zooming from the shortest to longest focal lengths.

The following table shows an example of the power distribution of the zoom lens system according to the present invention:

|  |  |  | S | M | L |
|---|---|---|---|---|---|
| $\phi_I$ | 0.00854 | $e_I$ | 7.0 | −21.7 | −38.6 |
| $\phi_{II}$ | −0.03500 | $e_{II}$ | 37.4 | −22.1 | −13.1 |
| $\phi_{III}$ | 0.02951 | $e_{III}$ | 23.3 | −28.5 | −47.6 |
| $\phi_{IV}$ | 0.00404 | f | 28.7 | −49.6 | −82.9 | wherein: $\phi_I$, $\phi_{II}$, $\phi_{III}$, and $\phi_{IV}$ represent the refractive powers of the first to fourth lens groups or units; $e_I$, $e_{II}$ and $e_{III}$ represent the axial distances in the thin lens system between the first and second lens groups or units, between the second and third lens groups or units, and between the third and fourth lens groups or units, respectively, and f represents the focal length of the whole lens system.

The refractive power of a first lens group or unit (I) is conventionally designed to be equal to approximately the refractive power of the whole lens system for the longest focal length. For example, the refractive power of a first lens group or unit is about 0.012 for a conventional zoom lens system with a variable focal length range, about 28.7 to 82.9. However, according to the present invention, the refractive power of the first lens group or unit is relatively small as is defined by condition (1). This is because the first lens group or unit (I) of the present invention is free from movement during the focusing operation. The refractive powers for the second and third lens groups or units are selected in correlation with the relatively small refractive power of the first lens group or unit to realize a desired zoom ratio of about 3. The air space between the first and second lens groups or units is minimal for the shortest focal length, while the air space between the second and third lens groups or units is minimal for the longest focal length.

The following Tables 1 to 8 disclose, respectively, the first through eighth embodiments of the present invention. In the Tables, f equals the focal length, r is the radius of curvature with respective sub numbers indicating the surfaces from the object to image side along the optical axis, d represents the axial distance and includes both the air spaces and the actual thickness of the lens components along the optical axis, N equals the refractive index and again, the sub numbers refer to the particular optical element from the object to image side, and finally, $\nu$ equals the Abbe number and the sub numbers refer to the specific lens elements from the object to image side. The air space distances, $d_3$, $d_9$, and $d_{17}$ in the Tables are provided with three separate values that disclose the relative displacement between each of the respective focal lengths that are offset by dashes.

TABLE 1

(Embodiment 1)

f = 28.7–50.0–82.9    F/4–4.5

| | Radius of Curvature | Axial Distance | Refractive Index | Abbe Number |
|---|---|---|---|---|
| I | $r_1$ 65.298 | $d_1$ 1.50 $N_1$ | 1.80518 $\nu_1$ | 25.2 |
| | $r_2$ 46.101 | $d_2$ 6.50 $N_2$ | 1.7425 $\nu_2$ | 52.9 |
| | $r_3$ 288.388 | $d_3$ 0.95–15.72–32.53 | | |
| II | $r_4$ 95.054 | $d_4$ 1.00 $N_3$ | 1.80100 $\nu_3$ | 46.9 |
| | $r_5$ 17.014 | $d_5$ 7.50 | | |
| | $r_6$ −178.026 | $d_6$ 0.80 $N_4$ | 1.80100 $\nu_4$ | 46.9 |
| | $r_7$ 100.496 | $d_7$ 1.44 | | |
| | $r_8$ 28.897 | $d_8$ 3.00 $N_5$ | 1.80518 $\nu_5$ | 25.2 |
| | $r_9$ 59.980 | $d_9$ 25.76–10.53–1.50 | | |
| III | $r_{10}$ 25.055 | $d_{10}$ 2.55 $N_6$ | 1.74250 $\nu_6$ | 52.9 |
| | $r_{11}$ −126.952 | $d_{11}$ 2.00 (diaphragm aperture stop) | | |
| | $r_{12}$ 19.625 | $d_{12}$ 2.00 $N_7$ | 1.64050 $\nu_7$ | 60.2 |
| | $r_{13}$ 35.451 | $d_{13}$ 1.90 | | |
| | $r_{14}$ −65.234 | $d_{14}$ 4.49 $N_8$ | 1.80741 $\nu_8$ | 31.4 |
| | $r_{15}$ 17.383 | $d_{15}$ 2.68 | | |
| | $r_{16}$ 58.444 | $d_{16}$ 3.16 $N_9$ | 1.6180 $\nu_9$ | 63.0 |
| | $r_{17}$ −30.237 | $d_{17}$ 5.96–11.17–30.26 | | |
| IV | $r_{18}$ −277.984 | $d_{18}$ 2.0 $N_{10}$ | 1.80518 $\nu_{10}$ | 25.2 |
| | $r_{19}$ −116.391 | | | |

TABLE 2

(Embodiment 2)

f = 28.8–50.0–82.5    F/3.5–4.5

| | Radius of Curvature | Axial Distance | Refractive Index | Abbe Number |
|---|---|---|---|---|
| I | $r_1$ 83.428 | $d_1$ 1.50 $N_1$ | 1.80518 $\nu_1$ | 25.2 |
| | $r_2$ 59.556 | $d_2$ 6.30 $N_2$ | 1.81600 $\nu_2$ | 46.6 |
| | $r_3$ 501.940 | $d_3$ 0.97–16.10–26.83 | | |
| II | $r_4$ 76.595 | $d_4$ 1.20 $N_3$ | 1.82050 $\nu_3$ | 43.0 |
| | $r_5$ 16.532 | $d_5$ 7.38 | | |
| | $r_6$ −187.250 | $d_6$ 1.00 $N_4$ | 1.63854 $\nu_4$ | 55.6 |
| | $r_7$ 41.542 | $d_7$ 1.18 | | |
| | $r_8$ 27.474 | $d_8$ 3.30 $N_5$ | 1.80518 $\nu_5$ | 25.2 |
| | $r_9$ 104.628 | $d_9$ 26.96–11.83–1.10 | | |
| III | $r_{10}$ 29.811 | $d_{10}$ 2.99 $N_6$ | 1.75450 $\nu_6$ | 51.6 |
| | $r_{11}$ 813.690 | $d_{11}$ 2.33 (diaphragm aperture stop) | | |
| | $r_{12}$ 18.961 | $d_{12}$ 2.80 $N_7$ | 1.69680 $\nu_7$ | 55.5 |
| | $r_{13}$ 31.875 | $d_{13}$ 1.45 | | |
| | $r_{14}$ −102.772 | $d_{14}$ 2.91 $N_8$ | 1.84666 $\nu_8$ | 23.9 |
| | $r_{15}$ 20.010 | $d_{15}$ 2.20 | | |
| | $r_{16}$ 79.388 | $d_{16}$ 3.30 $N_9$ | 1.61293 $\nu_9$ | 37.0 |

TABLE 2-continued

(Embodiment 2)

f = 28.8–50.0–82.5    F/3.5–4.5

| | Radius of Curvature | Axial Distance | Refractive Index | Abbe Number |
|---|---|---|---|---|
| | $r_{17}$ −25.768 | $d_{17a}$ 0.84–1.49–12.31 | | |
| | | stop of invariable aperture (A) | | |
| | | $d_{17b}$ 1.98–15.32–24.45 | | |
| IV | $r_{18}$ 84.829 | $d_{18}$ 2.50 $N_{10}$ | 1.66755 $\nu_{10}$ | 42.0 |
| | $r_{19}$ −5051.357 | $d_{19}$ 0.79 | | |
| | $r_{20}$ 356.278 | $d_{20}$ 1.50 $N_{11}$ | 1.62588 $\nu_{11}$ | 35.7 |
| | $r_{21}$ 166.333 | | | |

TABLE 3

(Embodiment 3)

f = 35.9–50.0–102.8    F/3.5–4.5

| | Radius of Curvature | Axial Distance | Refractive Index | Abbe Number |
|---|---|---|---|---|
| I | $r_1$ 76.442 | $d_1$ 1.5 $N_1$ | 1.80518 $\nu_1$ | 25.2 |
| | $r_2$ 45.872 | $d_2$ 5.56 $N_2$ | 1.816 $\nu_2$ | 46.6 |
| | $r_3$ 433.366 | $d_3$ 0.75–8.41–30.18 | | |
| II | $r_4$ 163.377 | $d_4$ 1.2 $N_3$ | 1.863 $\nu_3$ | 41.5 |
| | $r_5$ 19.184 | $d_5$ 6.4 | | |
| | $r_6$ −60.424 | $d_6$ 1.4 $N_4$ | 1.618 $\nu_4$ | 63.4 |
| | $r_7$ 167.764 | $d_7$ 0.1 | | |
| | $r_8$ 34.436 | $d_8$ 3.8 $N_5$ | 1.76182 $\nu_5$ | 26.6 |
| | $r_9$ 1325.9 | $d_9$ 32.26–21.28–1.49 | | |
| III | $r_{10}$ 33.066 | $d_{10}$ 3.74 $N_6$ | 1.757 $\nu_6$ | 47.7 |
| | $r_{11}$ 327.361 | $d_{11}$ 4.37 (diaphragm aperture stop) | | |
| | $r_{12}$ 24.128 | $d_{12}$ 3.74 $N_7$ | 1.6968 $\nu_7$ | 55.5 |
| | $r_{13}$ 64.83 | $d_{13}$ 1.87 | | |
| | $r_{14}$ −147.772 | $d_{14}$ 3.74 $N_8$ | 1.84666 $\nu_8$ | 23.9 |
| | $r_{15}$ 21.269 | $d_{15}$ 2.49 | | |
| | $r_{16}$ 104.115 | $d_{16}$ 3.12 $N_9$ | 1.62588 $\nu_9$ | 35.7 |
| | $r_{17}$ −36.988 | $d_{17a}$ −0.25–6.73–8.52 | | |
| | | stop of invariable aperture (A) | | |
| | | $d_{17b}$ 3.74–8.74–25.74 | | |
| IV | $r_{18}$ 42.771 | $d_{18}$ 3.12 $N_{10}$ | 1.62588 $\nu_{10}$ | 35.7 |
| | $r_{19}$ 66.606 | | | |

TABLE 4

(Embodiment 4)

f = 35.9–50.0–102.8    F/3.5–4.5

| | Radius of Curvature | Axial Distance | Refractive Index | Abbe Number |
|---|---|---|---|---|
| I | $r_1$ 126.272 | $d_1$ 1.5 $N_1$ | 1.80518 $\nu_1$ | 25.2 |
| | $r_2$ 63.291 | $d_2$ 5.56 $N_2$ | 1.816 $\nu_2$ | 46.6 |
| | $r_3$ ∞ | $d_3$ 0.87–13.24–41.80 | | |
| | $r_4$ 187.195 | $d_4$ 1.2 $N_3$ | 1.863 $\nu_3$ | 41.5 |
| | $r_5$ 20.714 | $d_5$ 6.4 | | |

TABLE 4-continued (Embodiment 4)

$f = 35.9-50.0-102.8$  F/3.5–4.5

| | | Radius of Curvature | Axial Distance | | Refractive Index | | Abbe Number |
|---|---|---|---|---|---|---|---|
| II | $r_6$ | −70.881 | | | | | |
| | | | $d_6$ 1.4 | $N_4$ | 1.618 | $\nu_4$ | 63.4 |
| | $r_7$ | 173.471 | | | | | |
| | | | $d_7$ 0.1 | | | | |
| | $r_8$ | 36.076 | | | | | |
| | | | $d_8$ 3.8 | $N_5$ | 1.7552 | $\nu_5$ | 27.5 |
| | $r_9$ | 4990.77 | | | | | |
| | | | $d_{9a}$ 19.44–14.20–2.50 | | | | |
| | | stop of invariable aperture ($A_1$) | | | | | |
| | | | $d_{9b}$ 16.46–8.46–−1.72 | | | | |
| III | $r_{10}$ | 32.512 | | | | | |
| | | | $d_{10}$ 3.74 | $N_6$ | 1.757 | $\nu_6$ | 47.7 |
| | $r_{11}$ | 635.16 | | | | | |
| | | | $d_{11}$ 4.36 | (diaphragm aperture stop) | | | |
| | $r_{12}$ | 21.826 | | | | | |
| | | | $d_{12}$ 3.74 | $N_7$ | 1.6968 | $\nu_7$ | 55.5 |
| | $r_{13}$ | 58.608 | | | | | |
| | | | $d_{13}$ 1.87 | | | | |
| | $r_{14}$ | −110.51 | | | | | |
| | | | $d_{14}$ 3.74 | $N_8$ | 1.8466 | $\nu_8$ | 23.9 |
| | $r_{15}$ | 20.069 | | | | | |
| | | | $d_{15}$ 2.49 | | | | |
| | $r_{16}$ | 121.643 | | | | | |
| | | | $d_{16}$ 3.12 | $N_9$ | 1.62588 | $\nu_9$ | 35.7 |
| | $r_{17}$ | −29.877 | | | | | |
| | | | $d_{17a}$ −0.75–0.63–3.31 | | | | |
| | | stop of invariable aperture ($A_2$) | | | | | |
| | | | $d_{17b}$ 4.24–7.24–22.24 | | | | |
| IV | $r_{18}$ | 47.529 | | | | | |
| | | | $d_{18}$ 2.5 | $N_{10}$ | 1.6206 | $\nu_{10}$ | 38.3 |
| | $r_{19}$ | 488.77 | | | | | |
| | | | $d_{19}$ 1.0 | | | | |
| | $r_{20}$ | −376.05 | | | | | |
| | | | $d_{20}$ 1.5 | $N_{11}$ | 1.61762 | $\nu_{11}$ | 52.7 |
| | $r_{21}$ | 52.751 | | | | | |

TABLE 5

(Embodiment 5)

$f = 28.80-40.00-82.50$  F/3.6–4.1–4.6

| | | Radius of Curvature | Axial Distance | | Refractive Index | | Abbe Number |
|---|---|---|---|---|---|---|---|
| I | $r_1$ | 98.268 | | | | | |
| | | | $d_1$ 1.700 | $N_1$ | 1.80518 | $\nu_1$ | 25.40 |
| | $r_2$ | 56.851 | | | | | |
| | | | $d_2$ 6.300 | $N_2$ | 1.81600 | $\nu_2$ | 46.60 |
| | $r_3$ | 7199.94 | | | | | |
| | | | $d_3$ 0.700–8.668–28.341 | | | | |
| II | $r_4$ | 104.813 | | | | | |
| | | | $d_4$ 1.200 | $N_3$ | 1.86300 | $\nu_3$ | 41.50 |
| | $r_5$ | 16.825 | | | | | |
| | | | $d_5$ 7.200 | | | | |
| | $r_6$ | −89.707 | | | | | |
| | | | $d_6$ 1.400 | $N_4$ | 1.61800 | $\nu_4$ | 63.40 |
| | $r_7$ | 61.672 | | | | | |
| | | | $d_7$ 0.100 | | | | |
| | $r_8$ | 28.752 | | | | | |
| | | | $d_8$ 3.800 | $N_5$ | 1.76182 | $\nu_5$ | 26.60 |
| | $r_9$ | 261.922 | | | | | |
| | | | $d_9$ 25.841–16.373–1.200 | | | | |
| III | $r_{10}$ | 26.962 | | | | | |
| | | | $d_{10}$ 3.000 | $N_6$ | 1.75700 | $\nu_6$ | 47.73 |
| | $r_{11}$ | 262.764 | | | | | |
| | | | $d_{11}$ 3.500 | (diaphragm aperture stop) | | | |
| | $r_{12}$ | 19.367 | | | | | |
| | | | $d_{12}$ 3.000 | $N_7$ | 1.69680 | $\nu_7$ | 55.52 |
| | $r_{13}$ | 52.037 | | | | | |
| | | | $d_{13}$ 1.500 | | | | |
| | $r_{14}$ | −118.613 | | | | | |
| | | | $d_{14}$ 3.000 | $N_8$ | 1.84666 | $\nu_8$ | 23.90 |
| | $r_{15}$ | 17.328 | | | | | |
| | | | $d_{15}$ 2.000 | | | | |
| | $r_{16}$ | 83.571 | | | | | |
| | | | $d_{16}$ 2.500 | $N_9$ | 1.62588 | $\nu_9$ | 35.70 |
| | $r_{17}$ | −29.690 | | | | | |
| | | | $d_{17a}$ −0.200–1.863–9.000 | | | | |

TABLE 5-continued (Embodiment 5)

$f = 28.80-40.00-82.50$  F/3.6–4.1–4.6

| | | Radius of Curvature | Axial Distance | | Refractive Index | | Abbe Number |
|---|---|---|---|---|---|---|---|
| | | stop of invariable aperture (A) | | | | | |
| | | | $d_{17b}$ 3.000–9.500–25.000 | | | | |
| IV | $r_{18}$ | 51.277 | | | | | |
| | | | $d_{18}$ 2.500 | $N_{10}$ | 1.62588 | $\nu_{10}$ | 35.70 |
| | $r_{19}$ | 92.269 | | | | | |

TABLE 6

(Embodiment 6)

$f = 35.88-49.83-102.78$  F/3.6–4.1–4.6

| | | Radius of Curvature | Axial Distance | | Refractive Index | | Abbe Number |
|---|---|---|---|---|---|---|---|
| I | $r_1$ | 126.272 | | | | | |
| | | | $d_1$ 1.500 | $N_1$ | 1.80518 | $\nu_1$ | 25.43 |
| | $r_2$ | 66.445 | | | | | |
| | | | $d_2$ 5.558 | $N_2$ | 1.81600 | $\nu_2$ | 46.60 |
| | $r_3$ | 84033.6 | | | | | |
| | | | $d_3$ 0.872–12.183–38.986 | | | | |
| II | $r_4$ | 187.195 | | | | | |
| | | | $d_4$ 1.200 | $N_3$ | 1.86300 | $\nu_3$ | 41.50 |
| | $r_5$ | 20.714 | | | | | |
| | | | $d_5$ 6.400 | | | | |
| | $r_6$ | −70.881 | | | | | |
| | | | $d_6$ 1.400 | $N_4$ | 1.61800 | $\nu_4$ | 63.40 |
| | $r_7$ | 173.471 | | | | | |
| | | | $d_7$ 0.100 | | | | |
| | $r_8$ | 36.076 | | | | | |
| | | | $d_8$ 3.800 | $N_5$ | 1.76182 | $\nu_5$ | 26.55 |
| | $r_9$ | 4990.87 | | | | | |
| | | | $d_9$ 33.806–21.626–1.492 | | | | |
| III | $r_{10}$ | 33.590 | | | | | |
| | | | $d_{10}$ 3.738 | $N_6$ | 1.75700 | $\nu_6$ | 47.73 |
| | $r_{11}$ | 327.361 | | | | | |
| | | | $d_{11}$ 4.361 | (diaphragm aperture stop) | | | |
| | $r_{12}$ | 24.128 | | | | | |
| | | | $d_{12}$ 3.738 | $N_7$ | 1.69680 | $\nu_7$ | 55.52 |
| | $r_{13}$ | 64.830 | | | | | |
| | | | $d_{13}$ 1.869 | | | | |
| | $r_{14}$ | −147.772 | | | | | |
| | | | $d_{14}$ 3.738 | $N_8$ | 1.84666 | $\nu_8$ | 23.90 |
| | $r_{15}$ | 21.629 | | | | | |
| | | | $d_{15}$ 2.492 | | | | |
| | $r_{16}$ | 104.115 | | | | | |
| | | | $d_{16}$ 3.115 | $N_9$ | 1.62588 | $\nu_9$ | 35.70 |
| | $r_{17}$ | −36.988 | | | | | |
| | | | $d_{17a}$ 0.750–5.302–7.736 | | | | |
| | | stop of invariable aperture (A) | | | | | |
| | | | $d_{17b}$ 2.737–10.802–26.736 | | | | |
| IV | $r_{18}$ | 63.882 | | | | | |
| | | | $d_{18}$ 3.115 | $N_{10}$ | 1.62588 | $\nu_{10}$ | 35.70 |
| | $r_{19}$ | 114.951 | | | | | |

TABLE 7

(Embodiment 7)

$f = 35.88-49.83-102.78$  F/3.6–4.1–4.6

| | | Radius of Curvature | Axial Distance | | Refractive Index | | Abbe Number |
|---|---|---|---|---|---|---|---|
| I | $r_1$ | 79.818 | | | | | |
| | | | $d_1$ 1.500 | $N_1$ | 1.76182 | $\nu_1$ | 26.55 |
| | $r_2$ | 43.478 | | | | | |
| | | | $d_2$ 5.558 | $N_2$ | 1.77250 | $\nu_2$ | 49.77 |
| | $r_3$ | 584.982 | | | | | |
| | | | $d_3$ 0.750–7.942–27.815 | | | | |
| II | $r_4$ | 137.535 | | | | | |
| | | | $d_4$ 1.200 | $N_3$ | 1.80500 | $\nu_3$ | 39.75 |
| | $r_5$ | 18.718 | | | | | |
| | | | $d_5$ 6.700 | | | | |
| | $r_6$ | −58.401 | | | | | |
| | | | $d_6$ 1.400 | $N_4$ | 1.61800 | $\nu_4$ | 63.40 |
| | $r_7$ | 169.678 | | | | | |
| | | | $d_7$ 0.100 | | | | |
| | $r_8$ | 34.205 | | | | | |
| | | | $d_8$ 3.800 | $N_5$ | 1.76182 | $\nu_5$ | 26.55 |

TABLE 7-continued
(Embodiment 7)

f = 35.88–49.83–102.78    F/3.6–4.1–4.6

| | Radius of Curvature | Axial Distance | Refractive Index | | Abbe Number | |
|---|---|---|---|---|---|---|
| | $r_9$ 515.722 | | | | | |
| | | $d_{9a}$ 9.404–3.250–0.368 | | | | |
| | | stop of invariable aperture ($A_1$) | | | | |
| | | $d_{9b}$ 23.308–17.269–11.441 | | | | |
| III | $r_{10}$ 33.965 | | | | | |
| | | $d_{10}$ 3.738 | $N_6$ | 1.75700 | $\nu_6$ | 47.73 |
| | $r_{11}$ 301.263 | | | | | |
| | | $d_{11}$ 4.361 | (diaphragm aperture stop) | | | |
| | $r_{12}$ 23.931 | | | | | |
| | | $d_{12}$ 3.738 | $N_7$ | 1.64050 | $\nu_7$ | 60.08 |
| | $r_{13}$ 64.373 | | | | | |
| | | $d_{13}$ 1.869 | | | | |
| | $r_{14}$ −130.822 | | | | | |
| | | $d_{14}$ 3.738 | $N_8$ | 1.80518 | $\nu_8$ | 25.43 |
| | $r_{15}$ 21.818 | | | | | |
| | | $d_{15}$ 2.492 | | | | |
| | $r_{16}$ 105.599 | | | | | |
| | | $d_{16}$ 3.115 | $N_9$ | 1.64769 | $\nu_9$ | 33.88 |
| | $r_{17}$ −36.988 | | | | | |
| | | $d_{17a}$ 0.750–5.967–11.441 | | | | |
| | | stop of invariable aperture ($A_2$) | | | | |
| | | $d_{17b}$ 3.800–9.300–28.800 | | | | |
| IV | $r_{18}$ 43.716 | | | | | |
| | | $d_{18}$ 3.000 | $N_{10}$ | 1.62135 | $\nu_{10}$ | 61.28 |
| | $r_{19}$ 328.623 | | | | | |
| | | $d_{19}$ 2.000 | $N_{11}$ | 1.62588 | $\nu_{11}$ | 35.70 |
| | $r_{20}$ 64.863 | | | | | |

TABLE 8
(Embodiment 8)

f = 35.9–50.0–102.8    F/3.5–4.5

| | Radius of Curvature | Axial Distance | Refractive Index | | Abbe Number | |
|---|---|---|---|---|---|---|
| I | $r_1$ 66.425 | | | | | |
| | | $d_1$ 1.500 | $N_1$ | 1.80518 | $\nu_1$ | 25.4 |
| | $r_2$ 40.650 | | | | | |
| | | $d_2$ 5.558 | $N_2$ | 1.81600 | $\nu_2$ | 46.6 |
| | $r_3$ 404.275 | | | | | |
| | | $d_3$ 0.750–7.369–25.915 | | | | |
| II | $r_4$ 150.710 | | | | | |
| | | $d_4$ 1.200 | $N_3$ | 1.86300 | $\nu_3$ | 41.5 |
| | $r_5$ 18.306 | | | | | |
| | | $d_5$ 6.400 | | | | |
| | $r_6$ −58.185 | | | | | |
| | | $d_6$ 1.400 | $N_4$ | 1.61800 | $\nu_4$ | 63.4 |
| | $r_7$ 140.647 | | | | | |
| | | $d_7$ 0.100 | | | | |
| | $r_8$ 33.260 | | | | | |
| | | $d_8$ 3.800 | $N_5$ | 1.76182 | $\nu_5$ | 26.7 |
| | $r_9$ 661.231 | | | | | |
| | | $d_{9a}$ 12.542–1.542–1.042 | | | | |
| | | stop of invariable aperture ($A_1$) | | | | |
| | | $d_{9b}$ 19.144–19.603–1.000 | | | | |
| III | $r_{10}$ 32.902 | | | | | |
| | | $d_{10}$ 3.738 | $N_6$ | 1.75700 | $\nu_6$ | 47.7 |
| | $r_{11}$ 385.181 | | | | | |
| | | $d_{11}$ 4.361 | (diaphragm aperture stop) | | | |
| | $r_{12}$ 23.859 | | | | | |
| | | $d_{12}$ 3.738 | $N_7$ | 1.69680 | $\nu_7$ | 55.5 |
| | $r_{13}$ 66.112 | | | | | |
| | | $d_{13}$ 1.869 | | | | |
| | $r_{14}$ −144.030 | | | | | |
| | | $d_{14}$ 3.738 | $N_8$ | 1.84666 | $\nu_8$ | 23.9 |
| | $r_{15}$ 21.022 | | | | | |
| | | $d_{15}$ 2.492 | | | | |
| | $r_{16}$ 106.023 | | | | | |
| | | $d_{16}$ 3.115 | $N_9$ | 1.62004 | $\nu_9$ | 36.3 |
| | $r_{17}$ −36.988 | | | | | |
| | | $d_{17a}$ −0.250–4.292–6.394 | | | | |
| | | stop of invariable aperture stop ($A_2$) | | | | |
| | | $d_{17b}$ 3.737–9.737–26.737 | | | | |
| IV | $r_{18}$ 46.559 | | | | | |
| | | $d_{18}$ 3.000 | $N_{10}$ | 1.66892 | $\nu_{10}$ | 45.0 |
| | $r_{19}$ 231.635 | | | | | |
| | | $d_{19}$ 1.000 | | | | |

TABLE 8-continued
(Embodiment 8)

f = 35.9–50.0–102.8    F/3.5–4.5

| Radius of Curvature | Axial Distance | Refractive Index | | Abbe Number | |
|---|---|---|---|---|---|
| $r_{20}$ 179.356 | | | | | |
| | $d_{20}$ 1.000 | $N_{11}$ | 1.62135 | $\nu_{11}$ | 61.3 |
| $r_{21}$ 63.100 | | | | | |

Figure 1B:
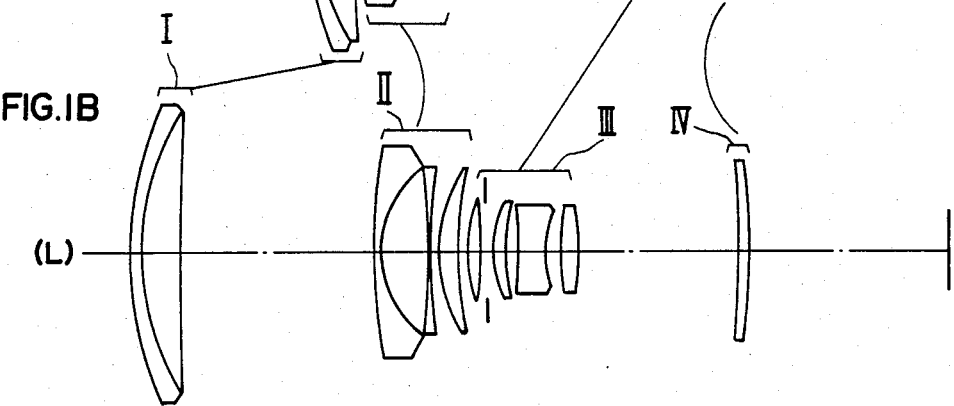
Figure 2A:
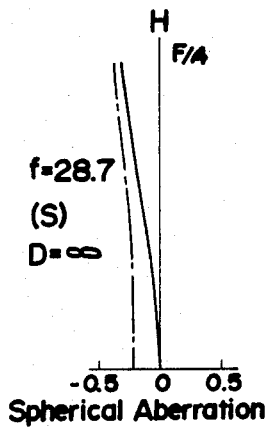
FIGS. 2A to 2C represent aberration curves of the first embodiment for the shortest focal length.
Figure 2B:
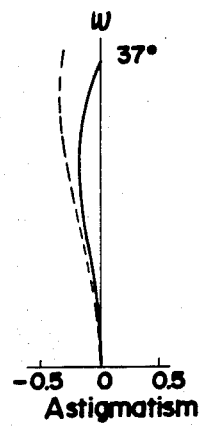
Figure 2C:
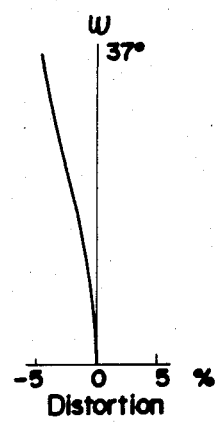
Figure 3A:
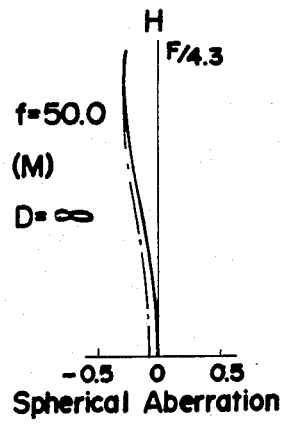
FIGS. 3A to 3C represent aberration curves of the first embodiment for a medium focal length.
Figure 3B:
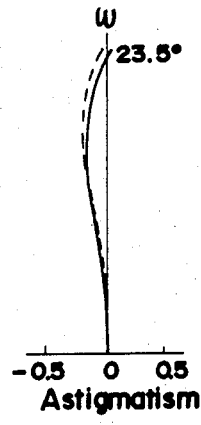
Figure 3C:
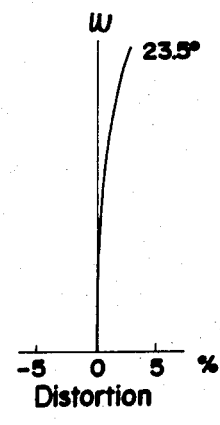
Figure 4A:
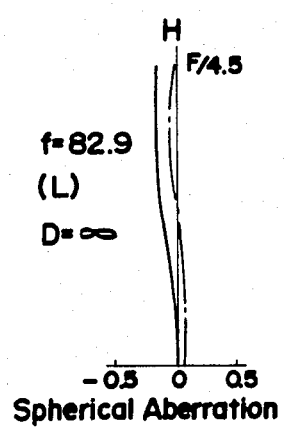
FIGS. 4A to 4C represent aberration curves of the first embodiment for the longest focal length.
Figure 4B:
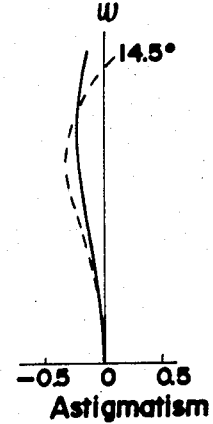
Figure 4C:
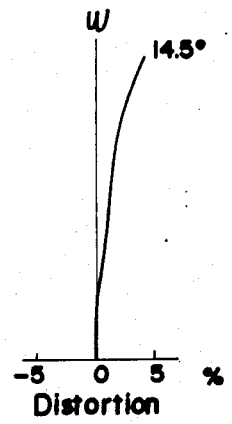

FIGS. 1A and 1B represent the schematic cross sectional views of the first embodiment of Table 1 for the shortest focal length (S) and the longest focal length (L), respectively. The lines extending between the Figures are to provide a relative understanding of the axial movements of the respective lens groups or units. FIGS. 2A, 2B and 2C, FIGS. 3A, 3B and 3C, and FIGS. 4A, 4B and 4C represent the aberration curves of the first embodiment in infinity focusing for the shortest (S), medium (M) and longest (L) focal lengths, respectively. FIGS. 5A, 5B and 5C, FIGS. 6A, 6B and 6C, and FIGS. 7A, 7B and 7C represent the aberration curves of the first embodiment during close focusing to D=1 m by means of the movement of the positive fourth lens group (IV) for the shortest (S), medium (M), and longest (L) focal lengths, respectively. The actual movement of the fourth lens unit (IV) toward the object side for focusing to D=1 m is 3.46 mm for the shortest focal length and 23.66 mm for the longest focal length.

Figure 8A:
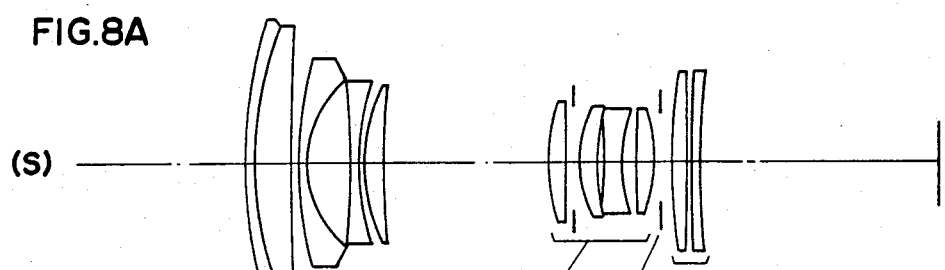
FIGS. 8A and 8B represent cross sectional views of the lens system according to a second embodiment of the present invention for the shortest and longest focal lengths, respectively.

FIGS. 8A to 11C relate to the second embodiment of Table 2 and can be understood in the same manner as FIGS. 1A to 4C. As is shown in FIGS. 8A and 8B, the fourth lens group or unit (IV) in the second embodiment is of an entirely positive refractive power and consists of a pair of positive and negative lens elements. Upon close focusing, any one of the following four modes can be adopted, i.e., (1) to move the positive lens element toward the object side with the negative lens element left stationary, (2) to move the negative lens element toward the image side with the positive lens element left stationary, (3) to move the positive lens element toward the object side and the negative lens element towards the image side, and (4) to move the entire fourth lens group or unit in one body towards the object side.

In the case of the above first mode, for example, the movement of the positive lens element toward the object side for focusing to D=1 m is by 1.43 mm for the shortest focal length and 10.36 mm for the longest focal length, and FIGS. 12A to 14C correspond to aberration curves in this case. Alternatively, according to the above fourth mode, the movement of the entire fourth lens group or unit (IV) toward the object side for focusing to D=1 m is by 1.92 mm for the shortest focal length and 13.84 mm for the longest focal length, which corresponds to the aberration curves in FIGS. 15A to 17C. Since the lens movement for focusing is greater in the above fourth mode than in the above first mode in the second embodiment, the difference in the lens movement between the cases of the shortest and longest focal lengths can be reduced if the fourth mode is preferred between the cases of the shortest and medium focal lengths, and the first mode between the cases of the medium and longest focal lengths. In the above first to third modes in which the lens elements in the fourth lens group or unit (IV) are separated upon focusing as in the second embodiment, it should be noted that the fourth lens group or unit (IV) moves as one unitary body for zooming and is separated to change the air space between the separated lens elements for focusing. Further, the fourth lens group or unit (IV) may be modified so as to be separated into three or more lens elements for focusing, if necessary.

Figure 8B:
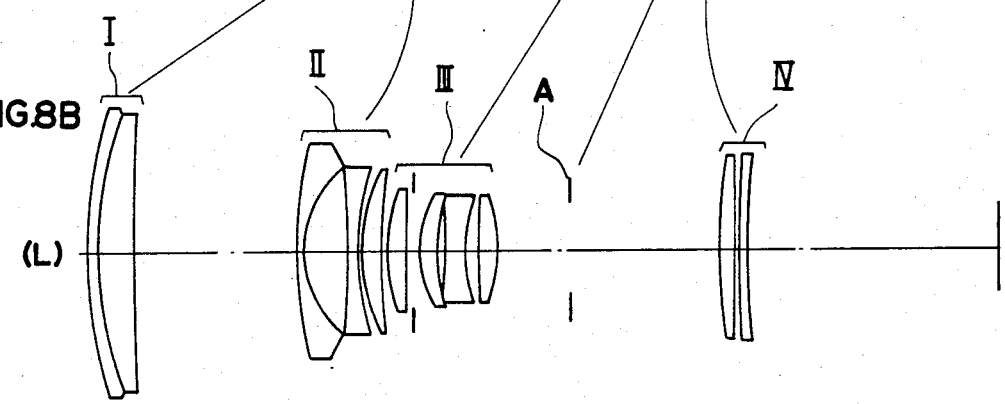
Figure 19A:
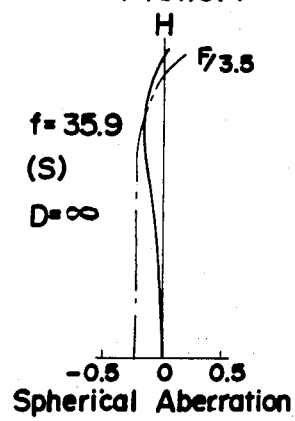
FIGS. 19A to 19C represent the aberration curves of the third embodiment for the shortest focal length.
Figure 19B:
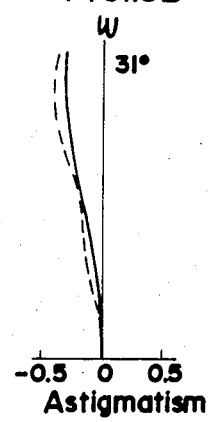
Figure 19C:
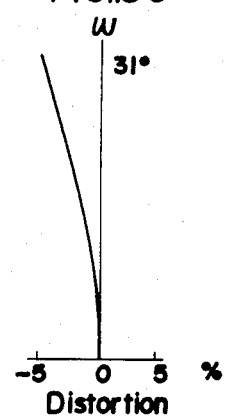
Figure 20A:
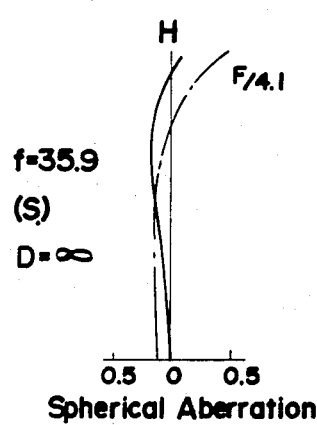
FIGS. 20A to 20C represent the aberration curves of the third embodiment for a medium focal length.
Figure 20B:
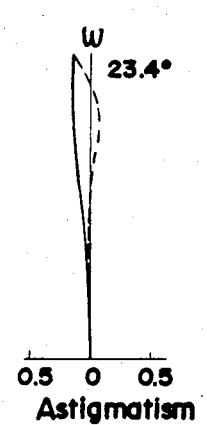
Figure 20C:
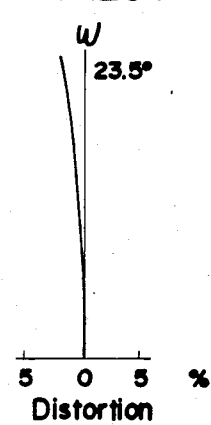
Figure 21A:
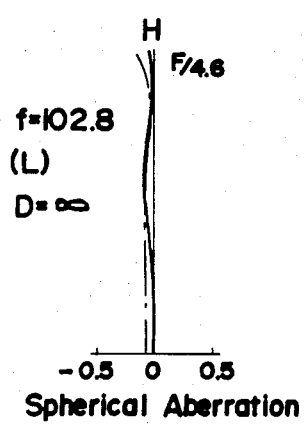
FIGS. 21A to 21C represent the aberration curves of the third embodiment for the longest focal length.
Figure 21B:
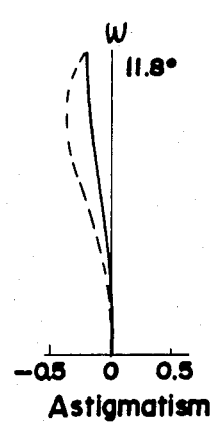
Figure 21C:
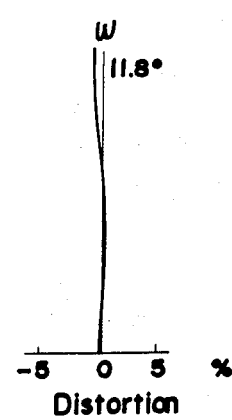
Figure 26A:
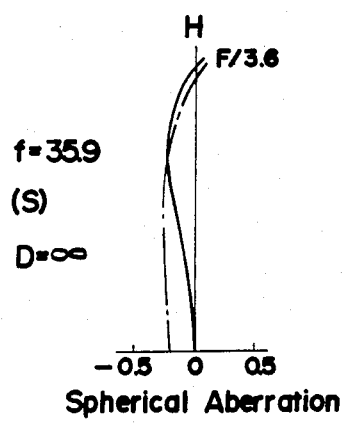
FIGS. 26A to 26C represent the aberration curves of the fourth embodiment for the shortest focal length.
Figure 26B:
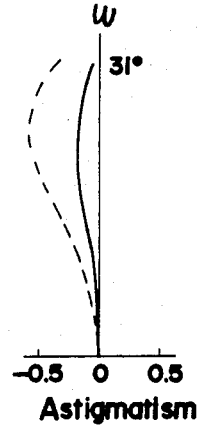
Figure 26C:
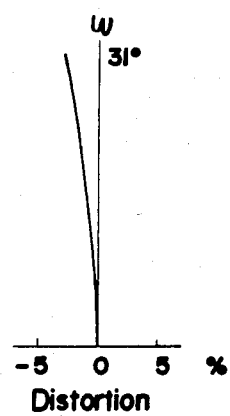
Figure 27A:
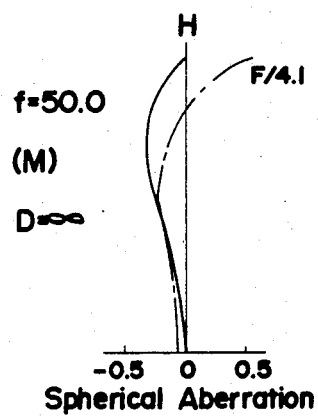
FIGS. 27A to 27C represent the aberration curves of the fourth embodiment for a medium focal length.
Figure 27B:
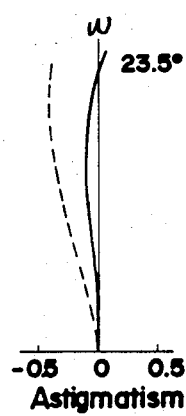
Figure 27C:
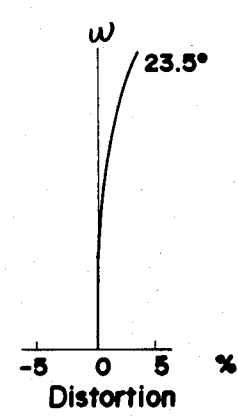
Figure 28A:
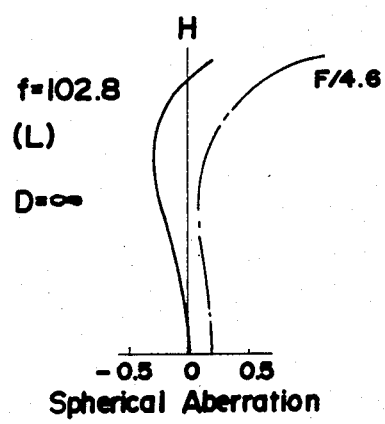
FIGS. 28A to 28C represent the aberration curves of the fourth embodiment for the longest focal length.
Figure 28B:
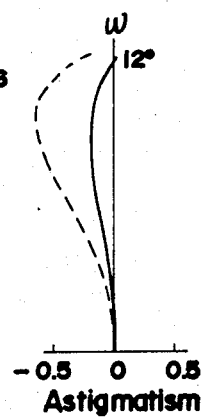
Figure 28C:
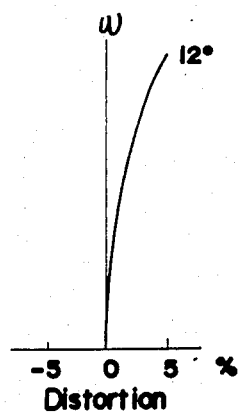
Figure 29A:
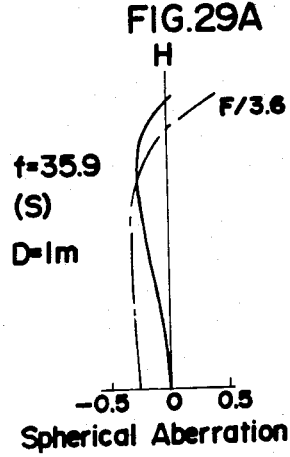
FIGS. 29A to 29C represent the aberration curves of the fourth embodiment for the shortest focal length in close focusing.
Figure 29B:
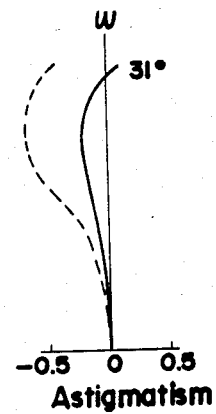
Figure 29C:
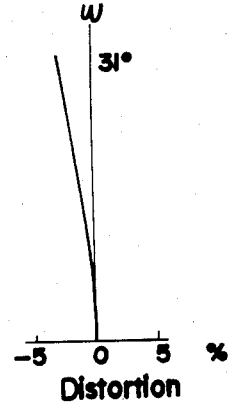
Figure 30A:
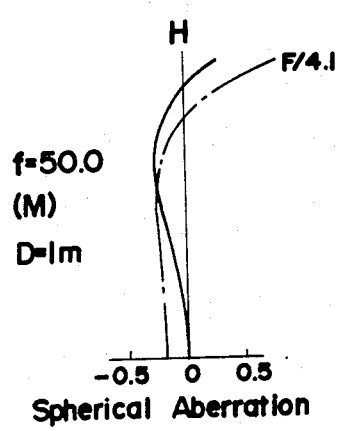
Figure 30B:
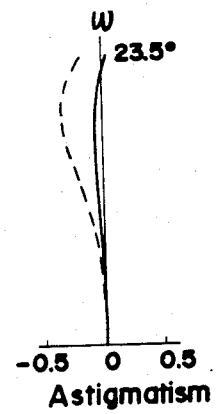
Figure 30B:
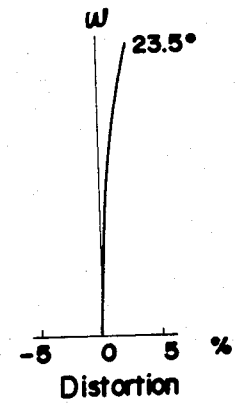
Figure 31:
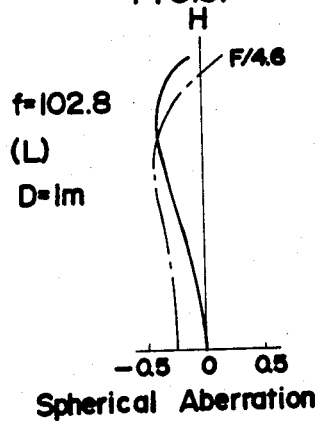
FIGS. 31A to 31C represent the aberration curves of the fourth embodiment for the longest focal length in close focusing.
Figure 31:
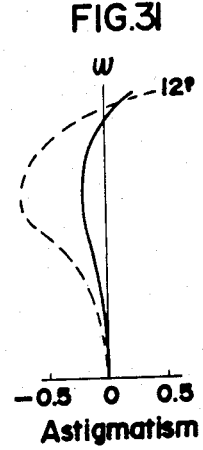
Figure 31:
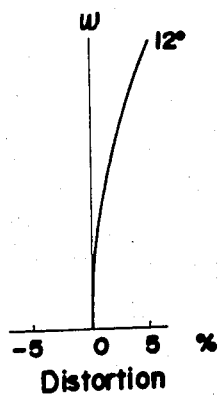

In FIGS. 8A and 8B, there is further illustrated, between the third and fourth lens groups or units, a stop (A) of an invariable aperture which is axially moved during zooming independently from the lens groups or units. This stop (A) is provided for cutting off the upper rays during the zooming mode of operation and especially between the medium and longest focal lengths for reducing the flare. In Table 2, $d_{17a}$ represents the axial distance between the lens surface, $r_{17}$, and the stop (A), and $d_{17a}+d_{17b}=d_{17}$ corresponds to the axial distance between lens surfaces, $r_{17}$ and $r_{18}$.

FIGS. 18A to 24C, which relate to the third embodiment of Table 3, can be understood in substantially the same manner as described above relative to the embodiment of FIGS. 1A to 7C. The movement of the positive fourth lens unit (IV) for focusing to D=1 m is by 2.96 mm for the shortest focal length and 21.33 mm for the longest focal length. Also in this embodiment, a stop (A) of an invariable aperture is moved during the zooming mode independently from the movement of the lens groups or units as in the second embodiment.

The third embodiment is characterized in that the second lens group or unit (II) is left stationary during the zooming mode, as indicated by the broken line between FIGS. 18A and 18B, and the first and second lens groups or units are moved in the same direction during the zooming. This particular lens movement during zooming is preferable if the lens barrel mechanism for controlling the lens movement is desired to be simplified.

FIGS. 25A to 31C relate to the fourth embodiment of Table 4. FIGS. 25A to 28C can be understood in substantially the same manner as the description of FIGS. 1A to 4C above. In this embodiment, the fourth lens group or unit (IV) is of an entirely negative refractive power and is divided into a pair of positive and negative lens elements. With respect to focusing, any one of the four modes substantially identical with those in the second embodiment can be adopted. In the fourth embodiment, however, it should be noted that the entire fourth lens group or unit as a unitary body is to be moved towards the image side for close focusing, if the fourth mode of focusing is adopted. For example, the amount of movement of the positive lens element towards the object side for focusing to D=1 m is 1.02 mm for the shortest focal length and 7.44 mm for the longest focal length, if the first mode of focusing is adopted. Alternatively, the amount of movement of the negative lens element towards the image side for focusing to D=1 m is 1.05 mm for the shortest focal length and 9.18 mm for the longest focal length in case of the second mode of focusing. FIGS. 29A to 31C correspond to the aberration curves for the above first mode of focusing.

It should be noted that the lower limit of condition (6) can be removed if the lens group or unit to be moved for focusing is of a negative refractive power and is moved towards the image side for close focusing as in the second mode in the second embodiment and the second and fourth modes in the fourth embodiment.

In FIGS. 25A and 25B, stop ($A_1$) of an invariable aperture, which is axially movable during zooming independently from the lens groups or units, is disclosed between the second and third lens groups or units in addition to a second stop ($A_2$) of invariable aperture between the third and fourth lens groups or units. This is for removing the flare caused by the lower rays. In Table 4, $d_{9a}$ and $d_{9b}$ are air spaces on both sides of stop ($A_1$) and the air space between lens surfaces, $r_9$ and $r_{10}$, is $d_{9a}+d_{9b}$ (=$d_9$). Air spaces, $d_{17a}$ and $d_{17b}$, are to be similarly understood with respect to stop ($A_2$).

FIGS. 32A to 38C which relate to the fifth embodiment of Table 5 can be understood in substantially the same manner as FIGS. 1A to 4C. The movement of the positive fourth lens unit (IV) toward the object side for focusing to D=1 m is 2.21 mm for the shortest focal length and 15.9 mm for the longest focal length.

Figure 32A:
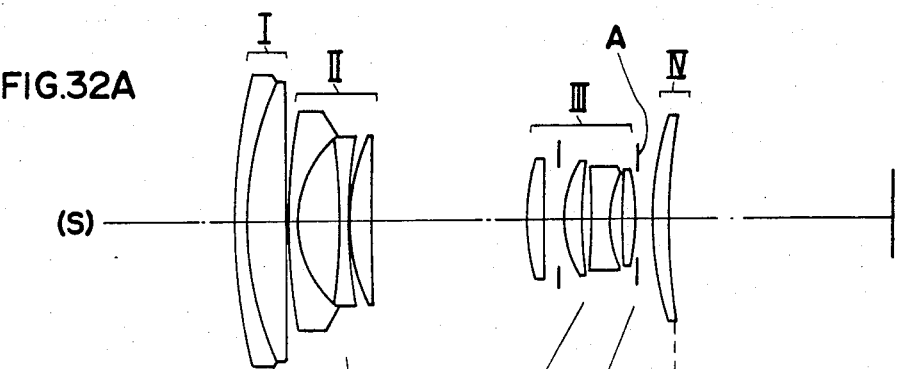
FIGS. 32A and 32B represent cross sectional views of the lens system according to a fifth embodiment of the present invention for the shortest and longest focal lengths, respectively.
Figure 32B:
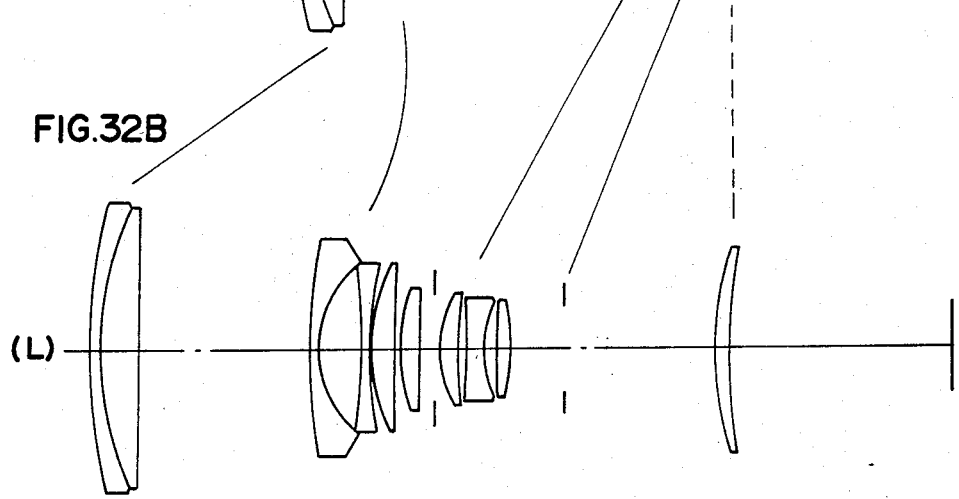
Figure 40A:
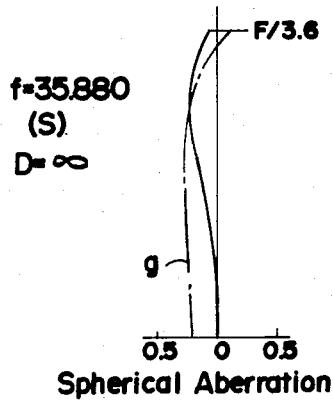
FIGS. 40A to 40C represent the aberration curves of the sixth embodiment for the shortest focal length.
Figure 40B:
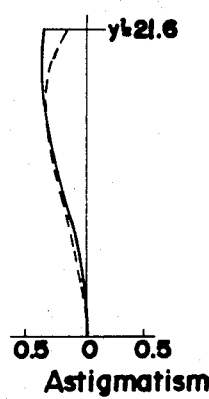
Figure 40C:
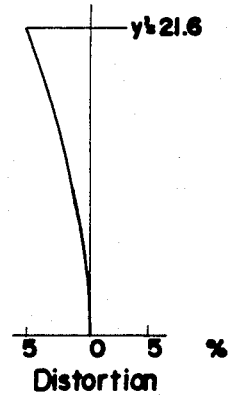
Figure 41A:
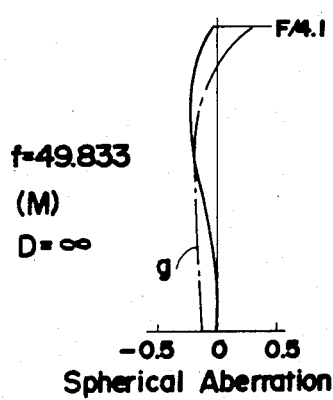
FIGS. 41A to 41C represent the aberration curves of the sixth embodiment for the medium focal length.
Figure 41B:
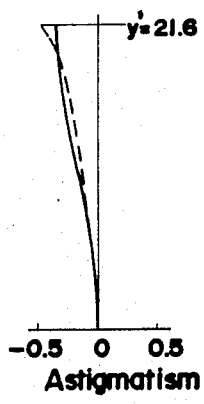
Figure 41C:
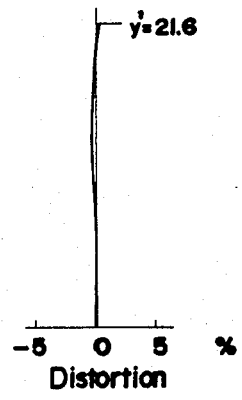
Figure 42A:
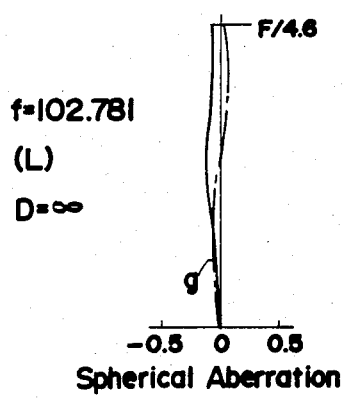
FIGS. 42A to 42C represent the aberration curves of the sixth embodiment for the longest focal length.
Figure 42B:
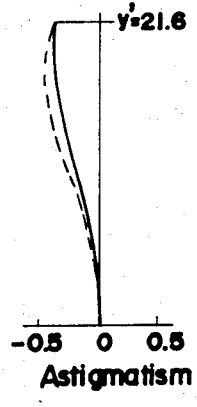
Figure 42C:
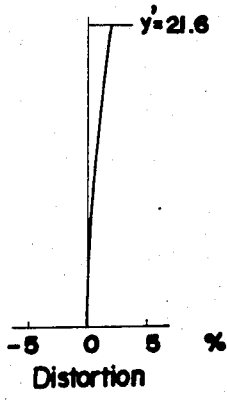
Figure 53A:
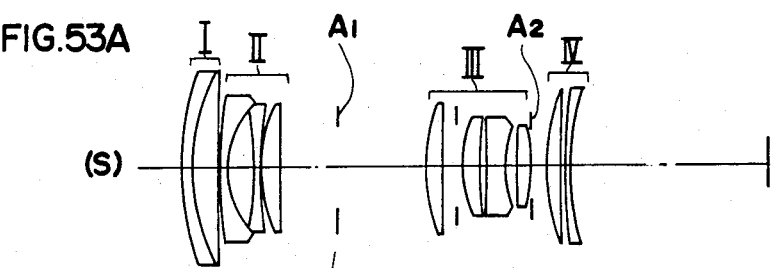
FIGS. 53A and 53B represent cross sectional views of the lens system according to an eighth embodiment of the present invention for the shortest and longest focal lengths, respectively.
Figure 53B:
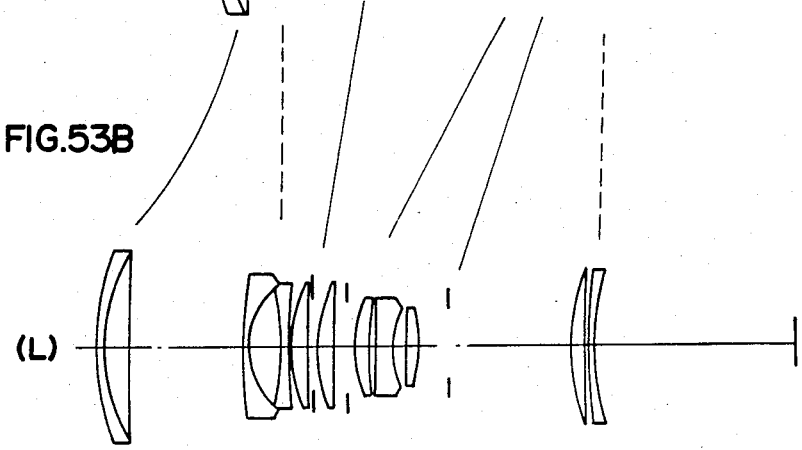
Figure 57A:
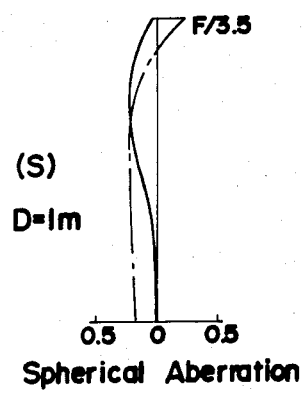
FIGS. 57A to 57C represent the aberration curves of the eighth embodiment for the shortest focal length in close focusing.
Figure 57B:
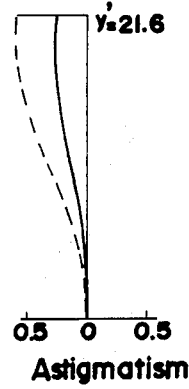
Figure 57C:
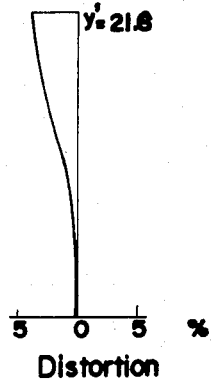
Figure 58A:
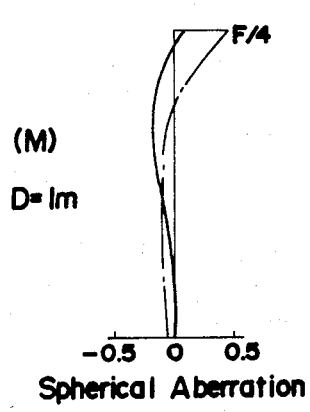
FIGS. 58A to 58C represent the aberration curves of the eighth embodiment for a medium focal length in close focusing.
Figure 58B:
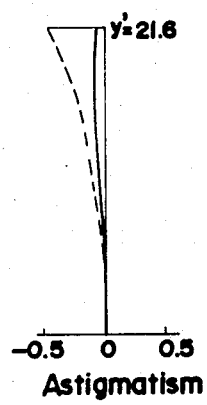
Figure 58C:
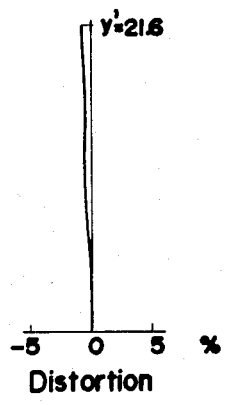
Figure 59A:
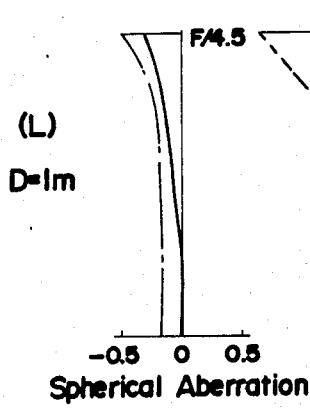
FIGS. 59A to 59C represent the aberration curves of the eighth embodiment for the longest focal length in close focusing.
Figure 59B:
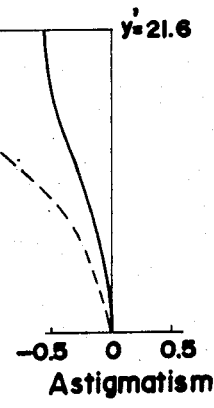
Figure 59C:
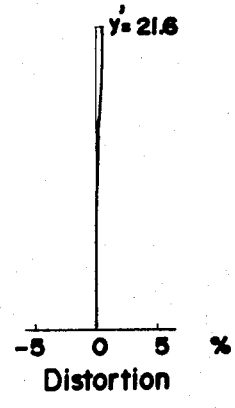
Figure 60A:
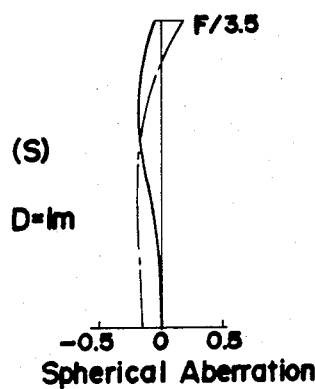
FIGS. 60A to 60C represent the aberration curves of the eighth embodiment for the shortest focal length in a different type of close focusing.
Figure 60B:
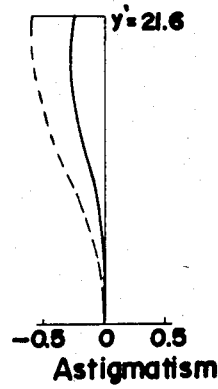
Figure 60C:
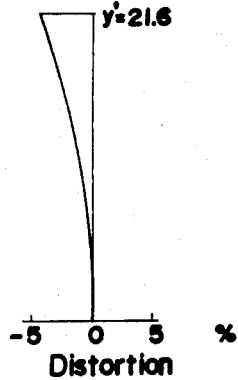
Figure 61A:
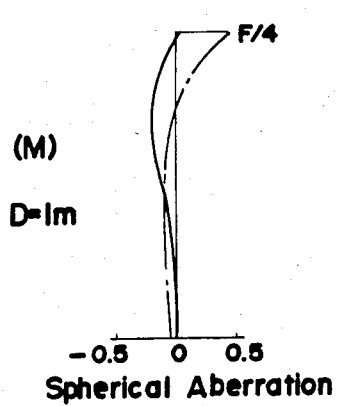
FIGS. 61A to 61C represent the aberration curves of the eighth embodiment for a medium focal length in a different type of close focusing.
Figure 61B:
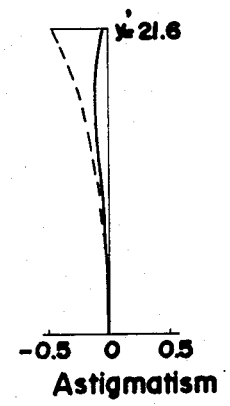
Figure 61C:
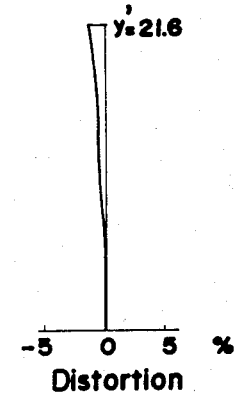
Figure 62A:
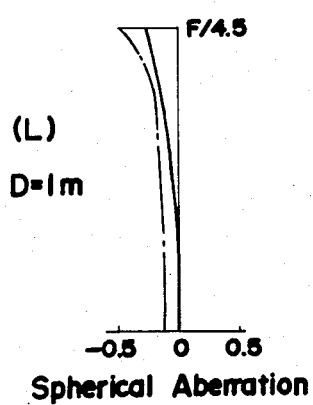
FIGS. 62A to 62C represent the aberration curves of the eighth embodiment for the longest focal length in a different type of close focusing.
Figure 62B:
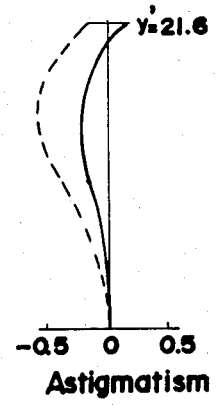
Figure 62C:
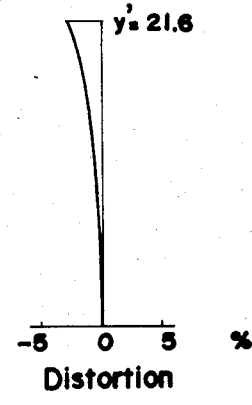

In the fifth embodiment, the fourth lens unit (IV) is left stationary during zooming as shown by the broken line between FIGS. 32A and 32B. This feature is common to the fifth to eighth embodiments of the present invention.

In case of the sixth embodiment in Table 6 and FIGS. 39A to 45C, the movement of the positive fourth lens unit (IV) toward the object side for focusing to D=1 m is 3.55 mm for the shortest focal length, and 24.88 mm for the longest focal length.

As to the seventh embodiment in Table 7 and FIGS. 46A to 52C, the movement of the positive fourth lens unit (IV) toward the object side for focusing to D−1 m is 3.12 mm for the shortest focal length, and 22.54 mm for the longest focal length.

In the seventh embodiment, the fourth lens unit (IV) consists of a cemented doublet in contrast to the fifth and sixth embodiments in which the fourth lens unit (IV) cosists of a single lens element. If the fourth lens unit or a part of it to be moved for focusing is formed by a cemented lens as in the seventh embodiment, the change in chromatic aberration caused by the lens movement in focusing can be reduced. This is especially meaningful for the case of close focusing at a relatively longer focal length in the zoom range, since the lens movement for focusing is greater and the change in chromatic aberration is correspondingly greater than when focusing at a relatively shorter focal length.

FIGS. 53A to 56C, which relate to the eighth embodiment in Table 8, can be understood substantially in the same manner as in FIGS. 1A to 4C. In the eight embodiment, the second lens group or unit II is left stationary during zooming in addition to the fourth lens group or unit (IV) as indicated by broken lines between FIGS. 53A and 53B, and the first and third lens groups or units are moved in the same direction during the zooming.

The fourth lens group or unit (IV) of the eighth embodiment consists of a pair of positive and negative lens elements, which can be separable for focusing as in the second or fourth embodiments. For example, the positive lens element is moved towards the object side by 1.28 mm for the shortest fodal length, or 9.56 mm for the longest focal length to focus to D=1 m with the negative lens element left stationary. The aberration curves for this type of close focusing are shown in 57A to 59C. Alternatively, the negative lens element can be moved toward the image side by 2.39 mm for the shortest focal length or 25.82 mm for the longest focal length to focus to D=1 m with the positive lens element left stationary, FIGS. 60A to 63C relating to this case. Of course, both the positive and negative lens elements can be moved in opposite directions, respectively.

As is apparent from the embodiments, in the zoom lens system according to the present invention, the first lens group or unit (I) includes at least one negative lens element and at least one positive lens element; the second lens group or unit (II) includes at least two negative lens elements and a rearmost positive lens element with a greater curvature at the object side surface thereof; the third lens group or unit (III) is of a modified triplet type including from the object to the image side at least two positive lens elements, a negative lens element with a greater curvature at the image side surface thereof, and at lest one positive lens element; and the fourth lens group or unit (IV) includes at least one positive lens element.

In the present invention, the feature that focusing can be practiced by means of the axial movement of the fourth lens group or unit (IV) or a part thereof, and the feature that the front first lens group or unit (I) is of a positive refractive power are closely related to each other. As already mentioned, conventional focusing in zoom lens systems is generally accomplished by means of the axial movement of the front lens group or unit because of the design advantage that the degree of movement required of the focusing lens group or unit to focus an identical object distance does not change, depending on the change in focal length. If the refractive power of the front lens group or unit is positive, however, the diameter of the front lens group or unit has to be increased to allow for its movement toward the object side for focusing when a zoom range is desired to also cover a wide field angle. Further, the total length of the lens system is generally greater. On the other hand, if the refractive power of the front lens group or unit is negative, it is difficult to increase the zoom ratio because of the aberration correction, the strict tolerance to manufacturing error, and the bulkiness of the lens system. In response to these disadvantages, the present invention provides a compact zoom lens system of a relatively high zoom ratio ranging to a wide field angle by means of a four-group or unit type lens system with a positive front lens group or unit of a relatively small diameter and incorporates focusing through the axial movement of the fourth lens group or unit or a part thereof which does not require a large diameter during its movement for focusing.

The above construction of the present invention, in which the positive front lens group or unit is free from the burden of a focusing operation, is effective to decrease the unevenness of power distribution, which further leads to the easiness of aberration correction and the compactness of the system. Additionally, the change in aberration caused by focusing is less with focusing by the fourth lens group or unit or a part thereof than in focusing by the front lens group or unit. This means that the lens group or unit to be moved for focusing, i.e., the fourth lens group or unit or a part thereof in the case of the present invention, can be of a relatively simple construction, such as a single lens element or a doublet, which is lightweight.

The above feature that the focusing lens group or unit is of lightweight and simple construction and is located at the image side of the lens system is particularly suitable to a focus control system in which the focusing lens group or unit is driven by a power source located within the camera body and controlled by an electric signal, such as a motor. In other words, the zoom lens system according to the present invention is extremely favorable to those cameras wherein focusing is accomplished by a driving power source under the control of an electric signal, such as an automatic focus control camera. This is because the focusing lens group or unit is located at the image side of the lens system, i.e., adjacent or inside the camera body, and is close to the driving source within the camera body to simplify the interconnection between the focusing lens group or unit and the driving source. Additionally, the use of a lightweight focusing lens group or unit saves power in driving it and permits a rapid focusing with less energy consumption of a battery or the like having a restricted capacity when contained in the camera body.

Although the degree of the movement of the focusing lens group or unit differs in dependence on the change in focal length for zooming, there is no problem if the focusing is under the control of an electric signal which is derived from an electric circuit in which the compensation for the difference in the degree of movement of the focusing lens group or unit is electrically dealt with. The difference in the degree of focusing lens movement is favorable to the compactness of the lens system, since the air space between the third and fourth lens groups or units is less in the shorter focal length to suit the less movement required of the focusing lens group, and the air space is greater in the longer focal length to suit the greater movement required of the focusing lens group or unit to focus to the identical object distance. Thus, the lens group or unit arrangement in the lens system according to the present invention removes useless air spaces in the lens system in total view of the requirements of both zooming and focusing to realize a desired compactness of the lens system.

With respect to the fifth to eighth embodiments in which the fourth lens group or unit (IV) is left stationary during zooming, the fourth lens group or unit (IV) is free from correlating its movement with the first to third lens groups or units for zooming. Therefore, the fourth lens group or unit (IV) can be designed separable from the first to third lens groups or units to be mounted not on the interchangeable lens barrel, but on the camera body C shown in FIG. 46. In this case, the interchangeable lens barrel only contains the first to third lens groups or units and has no focusing mechanism by itself. On the contrary, the camera body has a common focusing means comprising the fourth lens group or unit (IV) and its driving mechanism, and can receive any interchangeable lens having no focusing means other than the interchangeable zoom lens containing the first to third lens groups or units. Thus, this camera system comprises a camera body having the focusing means and a plurality of interchangeable lenses each having no independent focusing means by itself. These interchangeable lenses have to be designed with the fourth lens group or unit (IV) in the camera body taken into consideration to correct aberrations.

FIG. 46B schematically discloses the relationship of the camera body and the fourth focusing lens group or unit (IV). It should be appreciated that the relationship of the camera body and a fourth focusing lens unit (IV) has been shown with the seventh embodiment but could just as easily have been shown with the other embodiments disclosed herein and accordingly should not be limited to the seventh embodiment. The specifics of the mounting and movement of a focusing lens group or unit in a camera body are known as can be seen from the disclosures of U.S. Pat. Nos. 3,511,155, 3,599,552, and U.S. Pat. No. 3,945,023 which are incorporated herein by reference simply to disclose the knowledge of artisans of ordinary skill in supplementing the present invention disclosure.

The zoom lens system according to the present invention may be further modified in various manners. For example, the second and/or third lens groups or units can each be divided into two or more sub-groups or sub-units for correcting aberrations and increasing the zoom ratio by means of moving the sub-groups separately.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by these specific embodiments, but only by the scope and spirit of the appended claims.

What is claimed is:

1. A compact zoom lens system of a relatively high zoom ratio ranging to a wide field angle comprising, from object to image side:
    a first lens unit of a positive refractive power;
    a second lens unit of a negative refractive power, the total refractive power of the first and second lens units being negative;
    a third lens unit of a positive refractive power; and
    a fourth lens unit including at least a focusing lens unit of a relatively simple and lightweight construction, wherein air spaces between the first and second lens units, between the second and third lens units, and between the third and fourth lens units are changeable during a zooming mode of operation, and the focusing lens group is movable for focusing along the optical axis while the remaining part of the lens system other than the focusing lens unit is left stationary, wherein all of the first to fourth lens units are movable along the optical axis for zooming.

2. The invention of claim 1, wherein the fourth lens unit consists of only the focusing lens unit.

3. The invention of claim 1, wherein the fourth lens unit consists of two focusing lens units both movable with an air space therebetween changed for focusing.

4. The invention of claim 1, wherein the fourth lens unit is of a negative refractive power.

5. A compact zoom lens system of a relatively high zoom ratio ranging to a wide field angle comprising, from object to image side:
    a first lens unit of a positive refractive power;
    a second lens unit of a negative refractive power, the total refractive power of the first and second lens units being negative;
    a third lens unit of a positive refractive power; and
    a fourth lens unit including at least a focusing lens unit of a relatively simple and lightweight construction, wherein air spaces between the first and second lens units, between the second and third lens units, and between the third and fourth lens units are changeable during a zooming mode of operation, and the focusing lens group is movable for focusing along the optical axis while the remaining part of the lens system other than the focusing lens unit is left stationary, wherein the first, third and fourth lens units are movable along the optical axis for zooming with the second lens units left stationary.

6. The invention of claim 5, wherein the second lens unit is left stationary during zooming and the lens system fulfills the following condition:

$$-f_{I,II} < f_{I,II,III}$$

wherein: $f_{I,II}$ represents the total focal length of the first and second lens units; and $f_{I,II,III}$ represents the total focal length of the first to third lens units.

7. A compact zoom lens system of a relatively high zoom ratio ranging to a wide field angle comprising, from object to image side:
    a first lens unit of a positive refractive power;
    a second lens unit of a negative refractive power, the total refractive power of the first and second lens units being negative;
    a third lens unit of a positive refractive power; and
    a fourth lens unit including at least a focusing lens unit of a relatively simple and lightweight construction, wherein air spaces between the first and second lens units, between the second and third lens units, and between the third and fourth lens units are changeable during a zooming mode of operation, and the focusing lens group is movable for focusing along the optical axis while the remaining part of the lens system other than the focusing lens unit is left stationary, wherein the first to third lens units are movable for zooming with the fourth lens unit left stationary.

8. The invention of claim 7, wherein the fourth lens unit is free from any axial movement during a zooming mode of operation, and is separable from the first to third lens units, whereby the fourth lens unit including the focusing lens unit is utilizable as a common focusing unit by interchanging the first to third lens units with other lens systems having no independent focusing means.

9. A compact zoom lens system of a relatively high zoom ratio ranging to a wide field angle comprising, from object to image side:
    a first lens unit of a positive refractive power;
    a second lens unit of a negative refractive power, the total refractive power of the first and second lens units being negative;
    a third lens unit of a positive refractive power; and
    a fourth lens unit at least a focusing lens unit of a relatively simple and lightweight construction, wherein air spaces between the first and second lens units, between the second and third lens units, and between the third and fourth lens units are changeable during a zooming mode of operation, and the focusing lens group is movable for focusing along the optical axis while the remaining part of the lens system other than the focusing lens unit is left stationary, wherein the first and third lens units are movable for zooming with the second and fourth lens units left stationary.

10. The invention of claim 9, wherein the fourth lens unit is free from any axial movement during a zooming mode of operation, and is separable from the first to third lens units, whereby the fourth lens unit, including the focusing lens group, is utilizable as a common focusing unit by interchanging the first to third lens groups with other lens systems having no independent focusing means.

11. The invention of claim 7, wherein the second lens unit is left stationary during zooming and the lens system fulfills the following condition:

$$-f_{I,II} < f_{I,II,III}$$

wherein: $f_{I,II}$ represents the total focal length of the first and second lens units; and $f_{I,II,III}$ represents the total focal length of the first to third lens units.

12. A compact zoom lens system of a relatively high zoom ratio ranging to a wide field angle comprising, from object to image side:
   a first lens unit of a positive refractive power;
   a second lens unit of a negative refractive power, the total refractive power of the first and second lens units being negative;
   a third lens unit of a positive refractive power; and
   a fourth lens unit including at least a focusing lens unit of a relatively simple and lightweight construction, wherein air spaces between the first and second lens units, between the second and third lens units, and between the third and fourth lens units are changeable during a zooming mode of operation, and the focusing lens group is movable for focusing along the optical axis while the remaining part of the lens system other than the focusing lens unit is left stationary, wherein the first lens unit includes at least one negative lens element and at least one positive lens element; the second lens unit includes at least two negative lens elements and a rearmost positive lens element with a greater curvature at the object side surface thereof; the third lens unit is of a modified triplet type, including from the object to the image side at least two positive lens elements, a negative lens element with a greater curvature at the image side surface thereof, and at least one positive lens element, and the fourth lens unit includes at least one positive lens element.

13. The invention of claim 12, wherein the fourth lens unit consists of a positive single lens element.

14. The invention of claim 12, wherein the fourth lens unit consists, from object to image side, of a positive single lens element and a negative single lens element.

15. The invention of claim 12, wherein the fourth lens unit consists of a cemented doublet.

16. A compact zoom lens system of a relatively high zoom ratio ranging to a wide field angle comprising, from object to image side:
   a first lens unit of a positive refractive power;
   a second lens unit of a negative refractive power, the total refractive power of the first and second lens units being negative;
   a third lens unit of a positive refractive power; and
   a fourth lens unit including at least a focusing lens unit of a relatively simple and lightweight construction, wherein air spaces between the first and second lens units, between the second and third lens units, and between the third and fourth lens units are changeable during a zooming mode of operation, and the focusing lens unit is movable for focusing along the optical axis while the remaining part of the lens system other than the focusing lens unit is left stationary, wherein the fourth lens unit is of a positive refractive power.

17. The invention of claim 16, wherein the fourth lens unit is divided into two parts, one of which corresponds to the focusing lens unit.

18. The invention of claim 16, wherein the fourth lens unit is divided into a plurality of parts, and the whole fourth lens unit is moved in one body for zooming and separated for focusing.

19. The invention of claim 16, wherein the focusing lens unit consists of a single lens element.

20. The invention of claim 16, wherein the focusing lens unit consists of a cemented doublet.

21. A compact zoom lens system of a relatively high zoom ratio ranging to a wide field angle comprising, from object to image side:
   a first lens unit of a positive refractive power;
   a second lens unit of a negative refractive power, the total refractive power of the first and second lens units being negative;
   a third lens unit of a positive refractive power; and
   a fourth lens unit including at least a focusing lens unit of a relatively simple and lightweight construction, wherein air spaces between the first and second lens units, between the second and third lens units, and between the third and fourth lens units are changeable during a zooming mode of operation, and the focusing lens group is movable for focusing along the optical axis while the remaining part of the lens system other than the focusing lens unit is left stationary, further comprising a stop of invariable aperture shiftable along the optical axis between the third and fourth lens units independently from the lens movement for zooming.

22. The invention of claim 21, further comprising a second stop of invariable aperture shiftable along the optical axis between the second and third lens units independently from the lens movement for zooming.

23. In a combination lens system and camera body including an interchangeable front zoom lens unit that can be mounted to the camera body without any source of focusing within the front zoom lens unit, the improvement comprising;
   a rear lens unit including at least a focusing lens unit that optically compliments the front zoom lens unit to provide predetermined aberration corrections, focal length and lens speed for photography;
   means for mounting the rear lens unit integrally within the camera body to permit interchangeable mounting of front zoom lens units to optically interface with the camera rear lens unit, and
   means for driving the focusing lens unit.

24. A compact zoom lens system of a relatively high zoom ratio ranging to a wide field angle comprising, from object to image side:
   a first lens unit of a positive refractive power;
   a second lens unit of a negative refractive power, the total refractive power of the first and second lens units being negative;
   a third lens unit of a positive refractive power; and
   a fourth lens unit including at least a focusing lens unit of a relatively simple and lightweight construction, wherein air spaces between the first and second units, between the second and third lens units, and between the third and fourth lens units are changeable during a zooming mode of operation, all of the first to fourth lens units are movable along the optical axis for zooming and the focusing lens unit is movable for focusing along the optical axis while the remaining part of the lens system other than the focusing lens unit is left stationary, wherein the lens system fulfills the following conditions:

$$0.4 \frac{1}{f_L} < \frac{1}{f_I} < \frac{1}{f_L}$$

$$2.5 \frac{1}{f_I} < \frac{1}{|f_{III}|} < 5.0 \frac{1}{f_I}$$

$$-0.5 \frac{1}{f_L} < \frac{1}{f_{IV}} < \frac{1}{f_L}$$

wherein: $f_I$, $F_{II}$, and $F_{IV}$ represent focal lengths of the first, second and fourth lens units, respectively; and $f_L$ represents the longest focal length of the whole lens system.

25. The invention of claim 24, wherein the refractive power of the focusing lens unit is positive and the lens system further fulfills the following condition:

$$0.05 f_S < D_S < 0.5 f_S$$

wherein: $f_S$ represents the shortest focal length of the whole lens system; and $D_S$ represents the air space between the third and fourth lens units for the shortest focal length.

26. A compact zoom lens system of a relatively high zoom ratio ranging to a wide field angle comprising, from object to image side:
   a first lens unit of a positive refractive power;
   a second lens unit of a negative refractive power, the total refractive power of the first and second lens units being negative;
   a third lens unit of a positive refractive power; and
   a fourth lens unit including at least a focusing lens unit of a relatively simple and lightweight construction, wherein air spaces between the first and second units, between the second and third lens units, and between the third and fourth lens units are changeable during a zooming mode of operation, and the focusing unit is movable for focusing along the optical axis while the remaining part of the lens system other than the focusing lens unit is left stationary, the first, third and fourth lens units are movable along the optical axis for zooming with the second lens unit left stationary, wherein the lens system fulfills the following conditions:

$$0.4 \frac{1}{f_L} < \frac{1}{f_I} < \frac{1}{f_L}$$

$$2.5 \frac{1}{f_I} < \frac{1}{|f_{III}|} < 5.0 \frac{1}{f_I}$$

$$-0.5 \frac{1}{f_L} < \frac{1}{f_{IV}} < \frac{1}{f_L}$$

$$-f_{I,II} \leq f_{I,II,III}$$

wherein: $f_I$, $f_{II}$, and $f_{IV}$ represent focal lengths of the first, second and fourth lens units, respectively; $f_L$ represents the longest focal length of the whole lens system; $f_{I,II}$ represents the total focal length of the first and second lens units, and $f_{I,II,III}$ represents the total focal length of the first to third lens units.

27. The invention of claim 26, wherein the refractive power of the focusing lens unit is positive, and the lens units fulfill the following conditions:

$$0.05 f_S < D_S < 0.5 f_S$$

wherein: $f_S$ represents the shortest focal length of the whole lens system; and $D_S$ represents the air space between the third and fourth lens units for the shortest focal length.

28. A compact zoom lens system of a relatively high zoom ratio ranging to a wide field angle comprising, from object to image side:
   a first lens unit of a positive refractive power;
   a second lens unit of a negative refractive power, the total refractive power of the first and second lens units being negative;
   a third lens unit of a positive refractive power; and
   a fourth lens unit including at least a focusing lens unit of a relatively simple and lightweight construction, wherein air spaces between the first and second units, between the second and third lens units, and between the third and fourth lens units are changeable during a zooming mode of operation, and the focusing unit is movable for focusing along the optical axis while the remaining part of the lens system other than the focusing lens unit is left stationary, the first to third lens units are movable for zooming with the fourth lens unit left stationary wherein the lens system fulfills the following conditions:

$$0.4 \frac{1}{f_L} < \frac{1}{f_I} < \frac{1}{f_L}$$

$$0.25 \frac{1}{f_L} < |f_{III}| < 0.6 f_L$$

$$0.3 f_L < f_{III} < 0.7 f_L$$

wherein: $f_I$, $F_{II}$, and $F_{III}$ represent the focal lengths of the first to third lens units, respectively; and $f_L$ represents the longest focal length of the whole lens system.

29. The invention of claim 28, wherein the refractive power of the focusing lens unit is positive and the lens units fulfill the following condition:

$$0.05 f_S < D_S < 0.5 f_S$$

wherein: $f_S$ represents the shortest focal length of the whole lens system; and $D_S$ represents the air space between the third and fourth lens units for the shortest focal length.

30. A compact zoom lens system of a relatively high zoom ratio ranging to a wide field angle comprising, from object to image side:
   a first lens unit of a positive refractive power;
   a second lens unit of a negative refractive power, the total refractive power of the first and second lens units being negative;
   a third lens unit of a positive refractive power; and
   a fourth lens unit including at least a focusing lens unit of a relatively simple and lightweight construction, wherein air spaces between the first and second units, between the second and third lens units, and between the third and fourth lens units are changeable during a zooming mode of operation, and the focusing unit is movable for focusing along the optical axis while the remaining part of the lens system other than the focusing lens unit is left stationary, the first and third lens units are movable for zooming with the second and fourth lens units left stationary, wherein the lens system fulfills the following conditions:

$$0.4\frac{1}{f_L} < \frac{1}{f_I} < \frac{1}{f_L}$$

$$0.25 f_L < |f_{II}| < 0.6 f_L$$

$$0.3 f_L < f_{III} < 0.7 f_L$$

$$-f_{I,II} < f_{I,II,III}$$

wherein: $f_I$, $f_{II}$, and $f_{III}$ represents the focal lengths of the first to third lens units, respectively; $f_L$ represents the longest focal length of the whole lens system; $f_{I,II}$ represents the total focal length of the first and second lens units; and $f_{I,II,III}$ represents the total focal length of the first to third lens units.

31. The invention of claim 30, wherein the refractive power of the focusing lens unit is positive, and the lens units fulfill the following condition:

$$0.05 f_S < D_S < 0.05 f_S$$

wherein: $f_S$ represents the shortest focal length of the whole lens system; and $D_S$ represents the air space between the third and fourth lens units for the shortest focal length.

32. A compact zoom lens system of a relatively high zoom ratio ranging to a wide field angle comprising, from object to image side:
a first lens unit of a positive refractive power;
a second lens unit of a negative refractive power, the total refractive power of the first and second lens units being negative;
a third lens unit of a positive refractive power; and
a fourth lens unit including at least a focusing lens unit of a relatively simple and lightweight construction, wherein air spaces between the first and second units, between the second and third lens units, and between the third and fourth lens units are changeable during a zooming mode of operation, and the focusing unit is movable for focusing along the optical axis while the remaining part of the lens system other than the focusing lens unit is left stationary, wherein the refractive power of the focusing lens unit is positive, and the lens unit fulfills the following conditions:

$$0.05 f_S < D_S < 0.5 f_S$$

wherein: $f_S$ represents the shortest focal length of the whole lens system; and $D_S$ represents the air space between the third and fourth lens units for the shortest focal length.

33. A compact zoom lens system of a relatively high zoom ratio ranging to a wide field angle comprising, from objective to image side:
a first lens unit of a positive refractive power;
a second lens unit of a negative refractive power, the total refractive power of the first and second lens units being negative;
a third lens unit of a positive refractive power; and
a fourth lens unit including at least a focusing lens unit of a relatively simple and lightweight construction, wherein air spaces between the first and second units, between the second and third lens units, and between the third and fourth lens units are changeable during a zooming mode of operation, and the focusing unit is movable for focusing along the optical axis while the remaining part of the lens system other than the focusing lens unit is left stationary, wherein the lens system fulfills the following conditions:

$$0.4\frac{1}{f_L} < \frac{1}{f_I} < \frac{1}{f_L}$$

$$2.5\frac{1}{f_I} < \frac{1}{|f_{II}|} < 5.0\frac{1}{f_I}$$

$$-0.5\frac{1}{f_L} < \frac{1}{f_{IV}} < \frac{1}{f_L}$$

wherein: $f_I$, $f_{II}$, and $f_{IV}$ represent focal lengths of the first, second and fourth lens units, respectively; and $f_L$ represents the longest focal length of the whole lens system.

34. The invention of claim 33, wherein the lens system further fulfills the following conditions:

$$0.25 f_L < |f_{II}| < 0.6 f_L$$

$$0.3 f_L < f_{III} < 0.7 f_L$$

wherein: $f_{III}$ represents the focal length of the third lens unit.

35. The invention of claim 33, wherein the second lens unit is left stationary during zooming and the lens system fulfills the following conditions:

$$-f_{I,II} < f_{I,II,III}$$

wherein: $f_{I,II}$ represents the total focal length of the first and second lens units; and $f_{I,II,III}$ represents the total focal length of the first to third lens units.

36. The invention of claim 33, wherein the refractive power of the focusing lens unit is positive, and the lens unit fulfill the following condition:

$$0.05 f_S < D_S < 0.5 f_S$$

wherein: $f_S$ represents the shortest focal length of the whole lens system; and $D_S$ represents the air space between the third and fourth lens units for the shortest focal length.

37. In a combination camera body and zooming lens system wherein the camera body integrally mounts a fourth lens unit capable of axial movement for focusing, the improvement comprising:
a first lens unit of a positive refractive power;
a second lens unit of a negative refractive power; and
a third lens unit of a positive refractive power, the first through third lens units are mounted as a zooming lens system for correlated movement to provide only a zooming range of movement and are interchangeably mounted to the camera body, the fourth lens unit in the camera body is optically designed to complement the aberration corrections of the zooming lens system and is further independently movable to provide the only source of focusing for the zooming lens system, wherein the lens system fulfills the following conditions:

$$0.4\frac{1}{f_L} < \frac{1}{f_I} < \frac{1}{f_L}$$

-continued- $$0.25 \frac{1}{f_L} < |f_{II}| < 0.6 f_L$$

$$0.3 f_L < f_{III} < 0.7 f_L$$

wherein: $f_I$, $f_{II}$, and $f_{III}$ represent the focal lengths of the first to third lens units, respectively; and $f_L$ represents the longest focal length of the combined first through fourth lens units of the total lens system.

38. The invention of claim 37, wherein the refractive power of the fourth lens unit is positive and the total lens system fulfills the following condition:

$$0.05 f_S < D_S < 0.5 f_S$$

wherein: $f_S$ represents the shortest focal length of the combined first through fourth lens units of the total lens system; and $D_S$ represents the air space between the third and fourth lens units for the shortest focal length.

39. The invention of claim 37, wherein the fourth lens unit is a single lens element.

40. The invention of claim 37 wherein the fourth lens unit is a pair of lens elements.

41. A compact zoom lens system comprising the following design parameters:

| | | f = 28.7–50.0–82.9 Radius of Curvature | Axial Distance | F/4–4.5 Refractive Index | Abbe Number |
|---|---|---|---|---|---|
| I | $r_1$ | 65.298 | $d_1$ 1.50 $N_1$ | 1.80518 | $\nu_1$ 25.2 |
| | $r_2$ | 46.101 | $d_2$ 6.50 $N_2$ | 1.7425 | $\nu_2$ 52.9 |
| | $r_3$ | 288.388 | $d_3$ 0.95–15.72–32.53 | | |
| II | $r_4$ | 95.054 | $d_4$ 1.00 $N_3$ | 1.80100 | $\nu_3$ 46.9 |
| | $r_5$ | 17.014 | $d_5$ 7.50 | | |
| | $r_6$ | −178.026 | $d_6$ 0.80 $N_4$ | 1.80100 | $\nu_4$ 46.9 |
| | $r_7$ | 100.496 | $d_7$ 1.44 | | |
| | $r_8$ | 28.897 | $d_8$ 3.00 $N_5$ | 1.80518 | $\nu_5$ 25.2 |
| | $r_9$ | 59.980 | $d_9$ 25.76–10.53–1.50 | | |
| III | $r_{10}$ | 25.055 | $d_{10}$ 2.55 $N_6$ | 1.74250 | $\nu_6$ 52.9 |
| | $r_{11}$ | −126.952 | $d_{11}$ 2.00 (diaphragm aperture stop) | | |
| | $r_{12}$ | 19.625 | $d_{12}$ 2.00 $N_7$ | 1.64050 | $\nu_7$ 60.2 |
| | $r_{13}$ | 35.451 | $d_{13}$ 1.90 | | |
| | $r_{14}$ | −65.234 | $d_{14}$ 4.49 $N_8$ | 1.80741 | $\nu_8$ 31.4 |
| | $r_{15}$ | 17.383 | $d_{15}$ 2.68 | | |
| | $r_{16}$ | 58.444 | $d_{16}$ 3.16 $N_9$ | 1.6180 | $\nu_9$ 63.0 |
| | $r_{17}$ | −30.237 | $d_{17}$ 5.96–11.17–30.26 | | |
| IV | $r_{18}$ | −277.984 | $d_{18}$ 2.0 $N_{10}$ | 1.80518 | $\nu_{10}$ 25.2 |
| | $r_{19}$ | −116.391 | | | |

* * * * *